(12) United States Patent
Mack et al.

(10) Patent No.: US 12,544,833 B2
(45) Date of Patent: Feb. 10, 2026

(54) REFRACTORY ALLOYED IRON-BASED REDOX ACTIVE FOAMS FOR IRON-AIR BATTERIES, FABRICATING METHODS AND APPLICATIONS OF SAME

(71) Applicant: NORTHWESTERN UNIVERSITY, Evanston, IL (US)

(72) Inventors: Jacob Benjamin Mack, Chesterfield, MO (US); Samuel Mark Pennell, Chicago, IL (US); David C. Dunand, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 92 days.

(21) Appl. No.: 18/367,019

(22) Filed: Sep. 12, 2023

(65) Prior Publication Data
US 2024/0082912 A1    Mar. 14, 2024

Related U.S. Application Data

(60) Provisional application No. 63/406,320, filed on Sep. 14, 2022.

(51) Int. Cl.
| | |
|---|---|
| *C22C 38/12* | (2006.01) |
| *B22F 3/10* | (2006.01) |
| *B22F 3/11* | (2006.01) |
| *B22F 9/04* | (2006.01) |
| *C01B 3/00* | (2006.01) |
| *C01B 3/0084* | (2026.01) |

(52) U.S. Cl.
CPC .......... *B22F 3/1143* (2013.01); *B22F 3/1017* (2013.01); *B22F 9/04* (2013.01); *C01B 3/0084* (2013.01); *C22C 38/12* (2013.01); *B22F 2009/043* (2013.01); *B22F 2301/35* (2013.01); *B22F 2998/10* (2013.01); *B22F 2999/00* (2013.01)

(58) Field of Classification Search
None
See application file for complete search history.

(56) References Cited

U.S. PATENT DOCUMENTS

| | | |
|---|---|---|
| 8,758,948 B2 | 6/2014 | Narayan et al. |
| 10,343,213 B2 | 7/2019 | Park et al. |
| (Continued) | | |

FOREIGN PATENT DOCUMENTS

WO    WO-2023216592 A1 * 11/2023  ............... C25B 1/04

OTHER PUBLICATIONS

Tang et al., "Fe3O4/ZrO2 Composite as a Robust Chemical Looping Oxygen Carrier: A Kinetics Study on the Reduction Process", 2021, ACS Applied Energy Materials, 4, pp. 7091-7100. (Year: 2021).*

(Continued)

*Primary Examiner* — Xiaobei Wang
(74) *Attorney, Agent, or Firm* — troutman pepper locke; Tim Tingkang Xia, Esq.

(57) ABSTRACT

This invention in one aspect relates to an iron-based foam usable for an electrochemical device, comprising a composition comprising iron and a refractory element processed to form the iron-based foam having a hierarchical porous structure with self-assembled channels for gas flow reactions and internal space to accommodate volumetric changes on oxidation.

19 Claims, 29 Drawing Sheets

(56) References Cited

U.S. PATENT DOCUMENTS

| | | |
|---|---|---|
| 10,374,261 B2 | 8/2019 | Narayan et al. |
| 11,565,316 B2 * | 1/2023 | Lambert ............... B22F 3/1103 |
| 2020/0153037 A1 | 5/2020 | Renna et al. |

OTHER PUBLICATIONS

Energy Information Administration, U. Monthly Energy Review—Mar. 2022. (2022).

Wu, F.-B., Yang, B. & Ye, J.-L. Technologies of energy storage systems. in Grid-scale Energy Storage Systems and Applications 17-56 (Elsevier, 2019). doi:10.1016/b978-0-12-815292-8.00002-2.

Shriram Santhanagopalan, Kandler Smith, Jeremy Neubauer, Gi-Heon Kim, Ahmad Pesaran, M. K. Design and Analysis of Large Lithium-Ion Battery Systems. (2015).

Mogensen, M. B. et al. Reversible solid-oxide cells for clean and sustainable energy. Clean Energy 3, 175-201 (2019).

Xu, N., Li, X., Zhao, X., Goodenough, J. B. & Huang, K. A novel solid oxide redox flow battery for grid energy storage. Energy Environ. Sci. 4, 4942-4946 (2011).

Wang, C. et al. Recent Progress of Metal-Air Batteries—A Mini Review. Appl. Sci. 9, 2787 (2019).

Drenckhahn, W. et al. A Novel High Temperature Metal-Air Battery. Electrochem. Soc. 50, 125-135 (2013).

Zhang, C. & Huang, K. A Comprehensive Review on the Development of Solid-State Metal-Air Batteries Operated on Oxide-Ion Chemistry. Adv. Energy Mater. 11, (2020).

Menzler, N. H. et al. Power-To-Storage—The Use of an Anode-Supported Solid Oxide Fuel Cell as a High-Temperature Battery. ECS Trans. 57, 255-267 (2013).

Berger, C. M. et al. Development of storage materials for high-temperature rechargeable oxide batteries. J. Energy Storage 1, 54-64 (2015).

Trocino, S., Lo Faro, M., Zignani, S. C., Antonucci, V. & Aricò, A. S. High performance solid-state iron-air rechargeable ceramic battery operating at intermediate temperatures (500-650° C.). Appl. Energy 233-234, 386-394 (2019).

Zhao, X., Li, X., Gong, Y. & Huang, K. Enhanced reversibility and durability of a solid oxide Fe-air redox battery by carbothermic reaction derived energy storage materials. Chem. Commun. 50, 623-625 (2013).

Thursfield, A., Murugan, A., Franca, R. & Metcalfe, I. S. Chemical looping and oxygen permeable ceramic membranes for hydrogen production—a review. Energy Environ. Sci. 5, 7421-7459 (2012).

Zhang, W. et al. Thermodynamic Analyses of Iron Oxides Redox Reactions. 8th Pacific Rim Int. Congr. Adv. Mater. Process. 2013, PRICM 8 1, 777-789 (2013).

Leonide, A., Drenckhahn, W., Greiner, H. & Landes, H. Long Term Operation of Rechargeable High Temperature Solid Oxide Batteries. J. Electrochem. Soc. 161, A1297-A1301 (2014).

Saito, Y., Kosaka, F., Kikuchi, N., Hatano, H. & Otomo, J. Evaluation of Microstructural Changes and Performance Degradation in Iron-Based Oxygen Carriers during Redox Cycling for Chemical Looping Systems with Image Analysis. (2018). doi: 10.1021/acs.iecr.7b04966.

Bohn, C. D. et al. Stabilizing Iron Oxide Used in Cycles of Reduction and Oxidation for Hydrogen Production. doi:10.1021/ef100199f.

Jakus, A. E., Taylor, S. L., Geisendorfer, N. R., Dunand, D. C. & Shah, R. N. Metallic Architectures from 3D-Printed Powder-Based Liquid Inks. Adv. Funct. Mater. 25, 6985-6995 (2015).

Zhao, X., Gong, Y., Li, X., Xu, N. & Huang, K. Performance of Solid Oxide Iron-Air Battery Operated at 550° C. J. Electrochem. Soc. 160, A1241-1247 (2013).

Zhao, X., Gong, Y., Li, X., Xu, N. & Huang, K. Cyclic Durability of a Solid Oxide Fe-Air Redox Battery Operated at 650° C. J. Electrochem. Soc. 160, A1716-A1719 (2013).

Deville, S. Freeze-casting of porous ceramics: A review of current achievements and issues. Adv. Eng. Mater. 10, 155-169 (2008).

Scotti, K. L. & Dunand, D. C. Freeze casting - A review of processing, microstructure and properties via the open data repository, FreezeCasting.net. Prog. Mater. Sci. 94, 243-305 (2018).

Fukushima, M., Yoshizawa, Y. I. & Ohji, T. Macroporous Ceramics by Gelation-Freezing Route Using Gelatin. Adv. Eng. Mater. 16, 607-620 (2014).

Stolze, C., Janoschka, T., Schubert, U. S., Müller, F. A. & Flauder, S. Directional Solidification with Constant Ice Front Velocity in the Ice-Templating Process. Advanced Engineering Materials 18, 111-120 (2016).

Scotti, K. L., Northard, E. E., Plunk, A., Tappan, B. C. & Dunand, D. C. Acta Materialia Directional solidi fi cation of aqueous TiO 2 suspensions under reduced gravity. 124, 608-619 (2017).

Jo, H. et al. Morphological Study of Directionally Freeze-Cast Nickel Foams. doi:10.1007/s40553-016-0068-y.

Park, H. et al. Surface-oxidized, freeze-cast cobalt foams: Microstructure, mechanical properties and electrochemical performance. Acta Mater. 142, 213-225 (2018).

Plunk, A. A. & Dunand, D. C. Iron foams created by directional freeze casting of iron oxide, reduction and sintering. Mater. Lett. 191, 112-115 (2017).

Wilke, S. K., Mack, J. B., Kenel, C. & Dunand, D. C. Evolution of directionally freeze-cast Fe2O3 and Fe2O3+NiO green bodies during reduction and sintering to create lamellar Fe and Fe-20Ni foams. J. Alloys Compd. 889, 161707 (2022).

Wilke, S. K. & Dunand, D. C. Structural evolution of directionally freeze-cast iron foams during oxidation/reduction cycles. Acta Mater. 162, 90-102 (2019).

Lloreda-Jurado, P. J. et al. Structure-processing relationships of freeze-cast iron foams fabricated with various solidification rates and post-casting heat treatment. J. Mater. Res. (2020). doi:10.1557/jmr.2020.175.

Wilke, S. K. & Dunand, D. C. In operando tomography reveals degradation mechanisms in lamellar iron foams during redox cycling at 800° C. J. Power Sources 448, 227463 (2020).

Wilke, S. K., Lundberg, R. A. & Dunand, D. C. Hierarchical Structural Changes during Redox Cycling of Fe-Based Lamellar Foams Containing YSZ, CeO2, or ZrO2. ACS Appl. Mater. Interfaces 12, 27190-27201 (2020).

Otsuka, K., Kaburagi, T., Yamada, C. & Takenaka, S. Chemical storage of hydrogen by modified iron oxides. J. Power Sources 122, 111-121 (2003).

Wang, H., Zhang, J., Wen, F. & Bai, J. Effect of Mo dopants on improving hydrogen production by redox of iron oxide: catalytic role of Mo cation and kinetic study. RSC Adv. 3, 10341-10348 (2013).

Liu, X. & Wang, H. Hydrogen production from water decomposition by redox of Fe2O3 modified with single- or double-metal additives. J. Solid State Chem. 183, 1075-1082 (2010).

Wang, H., Liu, X. & Wen, F. Hydrogen production by the redox of iron oxide prepared by hydrothermal synthesis. Int. J. Hydrogen Energy 37, 977-983 (2012).

Wen, F., Wang, H. & Tang, Z. Kinetic study of the redox process of iron oxide for hydrogen production at oxidation step. Thermochim. Acta 520, 55-60 (2011).

Romero, E., Soto, R., Duran, P., Herguido, J. & Peña, J. A. Molybdenum addition to modified iron oxides for improving hydrogen separation in fixed bed by redox processes. Int. J. Hydrogen Energy 37, 6978-6984 (2012).

Wang, M., Li, N., Wang, Z., Chen, C. & Zhan, Z. Electrochemical performance and redox stability of solid oxide fuel cells supported on dual-layered anodes of Ni-YSZ cermet and Ni—Fe alloy. Int. J. Hydrogen Energy 47, 5453-5461 (2022).

Xu, N., Chen, M. & Han, M. Oxidation behavior of a Ni—Fe support in SOFC anode atmosphere. J. Alloys Compd. 765, 757-763 (2018).

Sakai, T., Inoishi, A., Ogushi, M., Ida, S. & Ishihara, T. Characteristics of Fe-air battery using Y2O3-stabilized-ZrO2 electrolyte with Ni—Fe electrode and Ba0.6La0.4CoO3-δ electrode operated at intermediate temperature. J. Energy Storage 7, 115-120 (2016).

Thaler, M. & Hacker, V. Storage and separation of hydrogen with the metal steam process. Int. J. Hydrogen Energy 37, 2800-2806 (2012).

(56) References Cited

OTHER PUBLICATIONS

Wilke, S. K. & Dunand, D. C. Fe—Ni foams self-heal during redox cycling: Via reversible formation/homogenization of a ductile Ni scaffold. J. Mater. Chem. A 8, 19375-19386 (2020).

Dougherty, R. & Kunzelmann, K.-H. Computing Local Thickness of 3D Structures with ImageJ. Microsc. Microanal. 13, 1678-1679 (2007).

Thyng, K. M., Greene, C. A., Hetland, R. D., Zimmerle, H. M. & DiMarco, S. F. True colors of oceanography. Oceanography 29, 9-13 (2016).

He, S. et al. Baseline correction for Raman spectra using an improved asymmetric least squares method. Anal. Methods 6, 4402-4407 (2014).

Newville, M., Stensitzki, T., Allen, D. B. & Ingargiola, A. LMFIT: Non-Linear Least-Square Minimization and Curve-Fitting for Python. (2014). doi:10.5281/ZENODO.11813.

Eigen, J., Rutjens, B. & Schroeder, M. Partial redox cycling of composite storage materials for rechargeable oxide batteries. J. Energy Storage 43, 103161 (2021).

Kubaschewski, O. Iron Binary Phase Diagrams. (1982).

Brandes, E. A. & Brook, G. B. Smithells Metals Reference Book. Butterworth Heinemann (1992).

Riedel, H. & Svoboda, J. A theoretical study of grain growth in porous solids during sintering. Acta Metall. Mater. 41, 1929-1936 (1993).

Liu, Y. & Patterson, B. R. Grain Growth Inhibition by Porosity. Acta Met. mater 41, 2651-2656 (1993).

Wagner, C. Internal oxidation of Cu—Pd and Cu—Pt alloys. Corros. Sci. 8, 889-893 (1968).

Combe, A. & Cabane, J. Mechanism of internal oxidation in silver alloys. Oxid. Met. 1984 211 21, 21-37 (1984).

Guruswamy, S., Park, S. M., Hirth, J. P. & Rapp, R. A. Internal oxidation of Ag—In alloys: Stress relief and the influence of imposed strain. Oxid. Met. 1986 261 26, 77-100 (1986).

Lin, B., Zhang, F., Feng, D., Tang, K. & Feng, X. Accumulative plastic strain of thawed saturated clay under long-term cyclic loading. Eng. Geol. 231, 230-237 (2017).

Tang, Y., Miao, Q., Qiu, S., Zhao, K. & Hu, L. Novel freeze-casting fabrication of aligned lamellar porous alumina with a centrosymmetric structure. J. Eur. Ceram. Soc. 34, 4077-4082 (2014).

Ojuva, A. et al. Mechanical performance and CO2 uptake of ion-exchanged zeolite A structured by freeze-casting. J. Eur. Ceram. Soc. 35, 2607-2618 (2015).

Bai, H., Chen, Y., Delattre, B., Tomsia, A. P. & Ritchie, R. O. Bioinspired large-scale aligned porous materials assembled with dual temperature gradients. Sci. Adv. 1, (2015).

Mack, J. B., Pennell, S. M. & Dunand, D. C. Microstructural evolution of lamellar Fe—25Ni foams during steam-hydrogen redox cycling. Submitted. 1-29.

Bahzad, H. et al. Iron-based chemical-looping technology for decarbonising iron and steel production. Int. J. Greenh. Gas Control 91, (2019).

Jones, N. J. A Study of the Oxidation of Fe1—xCox Alloys and their Resulting Magnetic Properties. (2011). doi:10.1184/R1/6714404.V1.

Peden, C. H. F., Kidd, K. B. & Shinn, N. D. Metal/metal-oxide interfaces: A surface science approach to the study of adhesion. J. Vac. Sci. Technol. A 9, 1518 (1991).

Pennell, S. M., Mack, J. B. & Dunand, D. C. Evolution of lamellar architecture and microstructure during redox cycling of Fe—Co and Fe—Cu foams. Submitted.

Kenel, C., Casati, N. P. M. & Dunand, D. C. 3D ink-extrusion additive manufacturing of CoCrFeNi high-entropy alloy microlattices. Nat. Commun. 2019 101 10, 1-8 (2019).

Mo, F.-, Ferndndez Guillermet, A. & Cbrdoba, A. Provisional the Fe—Mo (Iron-Molybdenum) System Phases and Structures Equilibrium Diagram Fig. 1 Fe—Mo Phase Diagram.

Koyama, K., Morishita, M., Harada, T. & Maekawa, N. Determination of Standard Gibbs Energies of Formation of of the Fe—Mo—O Ternary System and Phase of the Fe—Mo Binary System by Electromotive Force Measurement Using a Y 2 O 3-Stabilized ZrO 2 Solid Electrolyte the standard Gibbs energies of formation of.

Nelson, A. T., Sooby, E. S., Kim, Y. J., Cheng, B. & Maloy, S. A. High temperature oxidation of molybdenum in water vapor environments. J. Nucl. Mater. 448, 441-447 (2014).

Morales Estrella, R. Hydrogen Reduction Route towards the Production of Nano-Grained Alloys.—Synthesis and Characterization of Fe 2 Mo Powder.

Wang, H., et al. (2008). "Hydrogen Production by Redox of Cation-Modified Iron Oxide." The Journal of Physical Chemistry C 112(14): 5679-5688.

Hui, W., et al. (2008). "Hydrogen production by redox of bimetal cation-modified iron oxide." International Journal of Hydrogen Energy 33(23): 7122-7128.

Datta, P., et al. (2011). "Influence of molybdenum on the stability of iron oxide materials for hydrogen production with cyclic water gas shift process." Materials Chemistry and Physics 129(3): 1089-1095.

Zhang, C. and K. Huang (2016). "An Intermediate-Temperature Solid Oxide Iron-Air Redox Battery Operated on O2—Chemistry and Loaded with Pd-Catalyzed Iron-Based Energy Storage Material." ACS Energy Letters 1(6): 1206-1211.

Zhao, X., et al. (2012). "Energy storage characteristics of a new rechargeable solid oxide iron-air battery." RSC Advances 2(27): 10163-10166.

C. Kenel, T. Davenport, X. Li, R.N. Shah, D.C. Dunand "Kinetics of alloy formation and densification in Fe—Ni—Mo microfilaments extruded from oxide- or metal-powder inks". Acta Materialia vol. 193, 2020, 51-60.

* cited by examiner

REFRACTORY ALLOYED IRON-BASED REDOX ACTIVE FOAMS FOR IRON-AIR BATTERIES, FABRICATING METHODS AND APPLICATIONS OF SAME

CROSS-REFERENCE TO RELATED PATENT APPLICATION

This application claims priority to and the benefit of U.S. Provisional Application No. 63/406,320, filed Sep. 14, 2022, which is incorporated herein in its entirety by reference.

STATEMENT AS TO RIGHTS UNDER FEDERALLY-SPONSORED RESEARCH

This invention was made with government support under grant number CMMI2015641 awarded by the National Science Foundation. The government has certain rights in the invention.

FIELD OF THE INVENTION

The present invention relates generally to grid-scale electrochemical electricity storage and reversible hydrogen storage, and more particularly to refractory alloyed iron-based redox active foams for iron-air batteries, fabricating methods and applications of the same.

BACKGROUND OF THE INVENTION

The background description provided herein is to present the context of the invention generally. The subject matter discussed in the background of the invention section should not be assumed to be prior art merely due to its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

Grid-scale implementation of renewable energy production relying on intermittent sources (e.g., solar and wind) requires an energy storage system that allows excess electrical energy produced during high-production times to be stored and released later at low-production times, since the natural power source may not align with the demand for energy. This energy storage material should be inexpensive and produced at scale.

Iron-air batteries stand out as an environmentally sustainable, inexpensive and scalable technology for large-scale grid electrochemical storage, and may fill this need. In operation, redox-active Fe material acts as an energy storage system in tandem with a high temperature (500-800° C.) reversible solid oxide fuel cell. While the volumetric expansion and contraction of Fe commonly drives sintering in Fe powder-bed systems, shortening the lifetime, freeze-casting allows the fabrication of a porous, lamellar structure to avoid sintering. Fe-lamellae, however, suffer from the formation of Kirkendall porosity and associated fracture due to redox-stresses, leading to densification of the initially porous structure. In addition, most current iron-based systems are hindered by short cycle lifetime.

Therefore, a heretofore unaddressed need exists in the art to address the aforementioned deficiencies and inadequacies.

SUMMARY OF THE INVENTION

In one aspect, this invention relates to an iron-based foam usable for an electrochemical device, comprising: a composition comprising iron (Fe) and a refractory element processed to form the iron-based foam having a hierarchical porous structure with self-assembled channels for gas flow reactions and internal space to accommodate volumetric changes on oxidation.

In one embodiment, the iron-based foam is formed by directional, water-based freeze casting of the composition.

In one embodiment, the refractory element is adapted for sintering inhibition, thereby creating a hierarchical porous structure which promotes reactivity and allows for fracture to not affect bulk lamellar integrity.

In one embodiment, the refractory element comprises molybdenum (Mo), tungsten (W), tantalum (Ta), niobium (Nb), or vanadium (V).

In one embodiment, Mo is in a range of 10-50 at %, and Fe is in balance in the iron-based foam.

In one embodiment, Mo is 25 at % in the iron-based foam.

In one embodiment, in the Fe-25Mo freeze-cast foam, the Mo content is increased in order to induce hierarchical porosity: the freeze-cast channels provide mesoscale porosity for bulk gas flow, and the Mo content induces microscale porosity within the lamellae to prevent sample degradation by providing internal pores that the iron can fill on oxidation.

In one embodiment, the Fe-25Mo freeze-cast foam, when subjected to steam-hydrogen redox cycling at about 800° C., is much more damage- and sintering-resistant than Fe, Fe-25Ni and Fe-25Co foams, and after 50 redox cycles at about 800° C., the Fe-25Mo freeze-cast foam maintains at least 80% of its initial porosity.

In one embodiment, the iron-based foam has three distinct phases: (i) α-Fe(Mo) solid solution with a BCC crystal structure, (ii) Fe-rich μ-phase, composition close to μ-$Fe_3Mo_2$, and (iii) mixed Fe—Mo carbide, $Fe_3Mo_3C$, with a FCC crystal structure.

In one embodiment, the iron-based foam is a combination of the α-Fe(Mo) phase, representing 51.5 mol %, the μ-$Fe_3Mo_2$ phase, representing 45.1 mol %), and $Fe_3Mo_3C$ representing 3.4 mol %.

In one embodiment, the carbon comes from the binder burnout during the reduction and sintering process, with an initial carbon content of 0.49 wt. %.

In one embodiment, within the microstructure, the phases are presented in two distinct regions representing a Fe-rich region and a Mo-rich region.

In one embodiment, during redox cycling with steam and hydrogen, respectively, the iron-based foam undergoes reversible oxidation and reduction, without internal damage, because of its hierarchical microstructure and the sintering inhibition provided by Mo.

In one embodiment, the composition further comprises at least one of tungsten (W) and nickel (Ni).

In one embodiment, the iron-based foam is a hierarchically porous foam including: wide channels between neighboring lamellae, which operably provide gas access to lamellae, into and out of the foams and accommodate lamellar expansion and contraction without interlamellar contact and sintering, thereby preventing macroscopic foam densification; and/or microporosity within lamellae, which operably provides additional gas access and free volume to accommodate the volumetric expansion of lamellae during oxidation, thereby limiting the radial expansion of lamellae, lowers the diffusion distances during oxidation, thereby accelerating kinetics and limiting formation of Kirkendall pores, and provides additional Kirkendall pore sinks, thereby preventing large-scale cracking of lamellae.

In another aspect, the invention relates to an electrochemical device comprising at least one iron-based foam disclosed above.

In one embodiment, the electrochemical device comprises an iron-air battery, or a hydrogen storage system.

In yet another aspect, the invention relates to a method of forming an iron-based foam usable for an electrochemical device, comprising mixing water, dispersant, binder, and powder precursors to form a suspension thereof; ball milling the suspension; and freezing the ball milled suspension directionally; sublimating the frozen suspension, leaving behind a porous green body, which is reduced with hydrogen to a Fe—Mo porous lamellar alloy; and sintering partially densifies the Fe—Mo lamellae, leading to a lamellar foam comprising colonies of aligned, porous lamellae separated by gas-flow channels.

In one embodiment, the dispersant comprises propylene glycol or sodium polyacrylate.

In one embodiment, the binder comprises polyethylene glycol (PEG), polystyrene (PS), or any other water soluble polymer such as polyvinyl alcohol (PVA).

In one embodiment, the powder precursors comprises $Fe_2O_3$, $Fe_3O_4$, or FeO and $MoO_3$, or any metal powders Fe and refractory metal powders Mo, W, Ta, Nb, V and their oxides, and any mixed oxides, mixed metals, or mixed metals and oxides, or any other compound beyond oxides (hydrides, carbides, nitrides) that can be reduced to form a metallic precursor, and any mixtures of the above.

In one embodiment, the suspension comprises about 10 vol % oxide powders, 2 vol % binder, and 0.5 vol % dispersant.

In one embodiment, after sintering of the structure, the iron-based foam has a hierarchical porous structure that allows for ample gas flow, rapid reduction and oxidation reactions, and room for volumetric expansion and contraction upon redox cycling with steam and hydrogen.

These and other aspects of the present invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

Panel (c): SEM BSE image of ion-milled lamellae after full reduction. Panel (d): Magnified region, with corresponding EDS maps. White dashed lines outline grains to help show compositional differences. Blue arrows highlight newly reduced regions, green arrows speckled areas within Mo-rich regions, orange arrows Mo-rich grains, Grey arrows Fe-rich.

Figure 9:
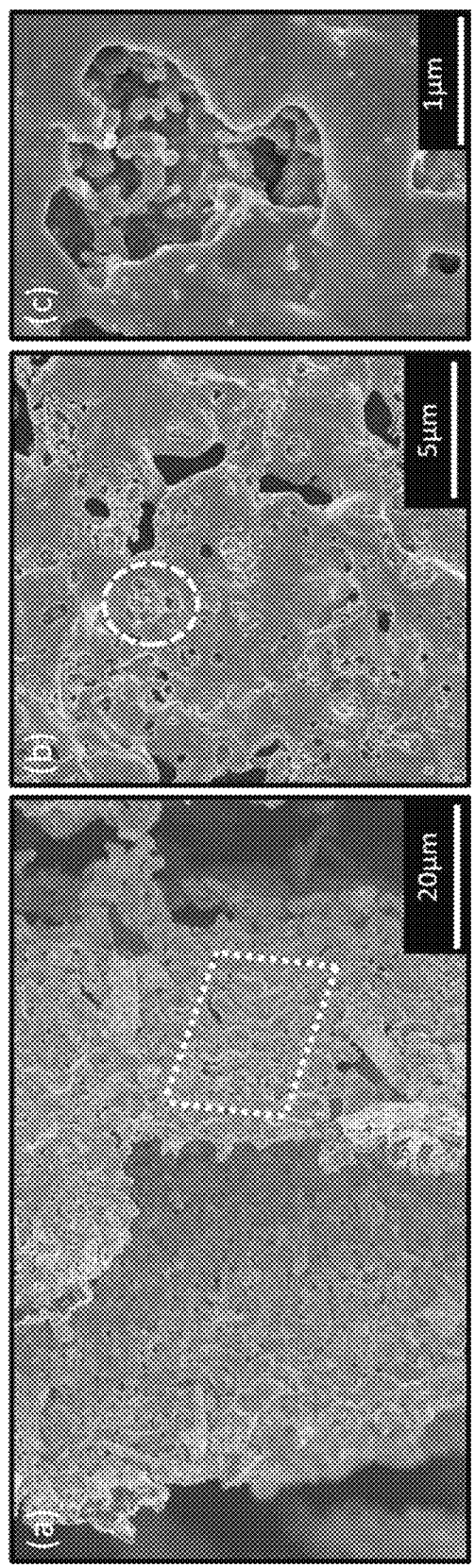

FIG. 9 shows exterior SEM imaging of Fe-25Mo lamellae after 1 redox cycle according to embodiments of the invention. Panel (a): Low-magnification image of lamellar wall. Panel (b): Side on view, highlighting internal porosity. Panel (c): magnified region of internal porosity, showing internal morphology.

Figure 10:
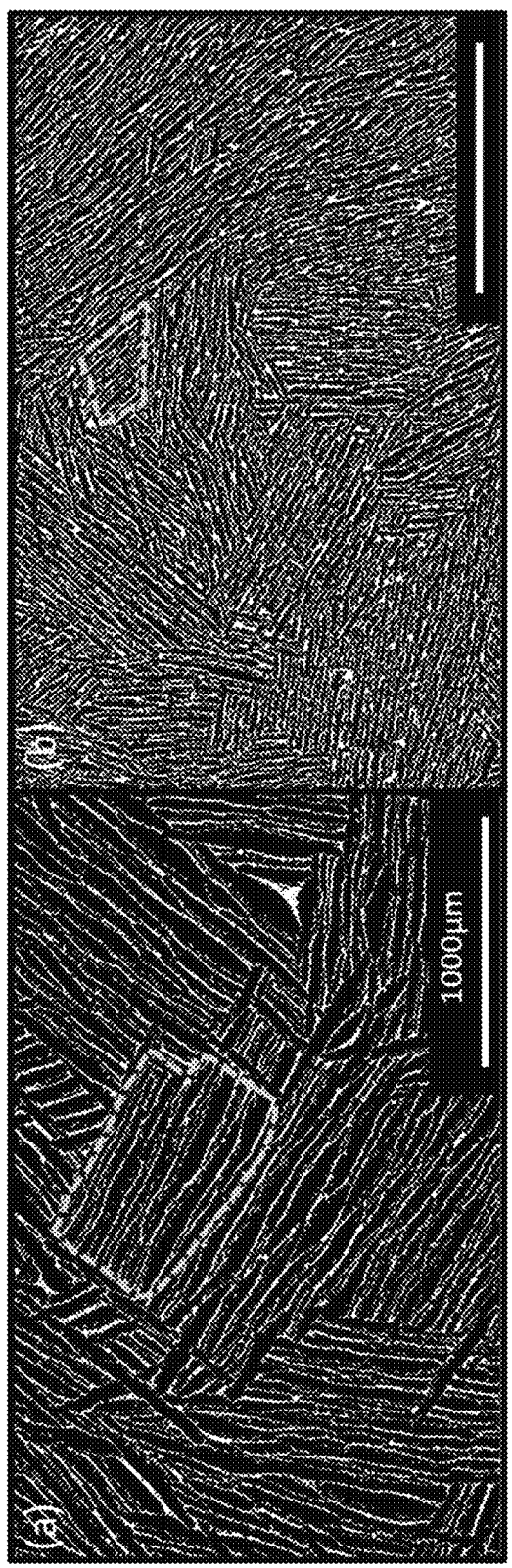

FIG. 10 shows cross sectional optical micrographs of Fe-25Mo foams for wavelength (panel (a)) $\lambda$=50 µm, and (panel (b)) $\lambda$=30 µm, according to embodiments of the invention. Dashed yellow lines highlight example colonies.

Figure 11:
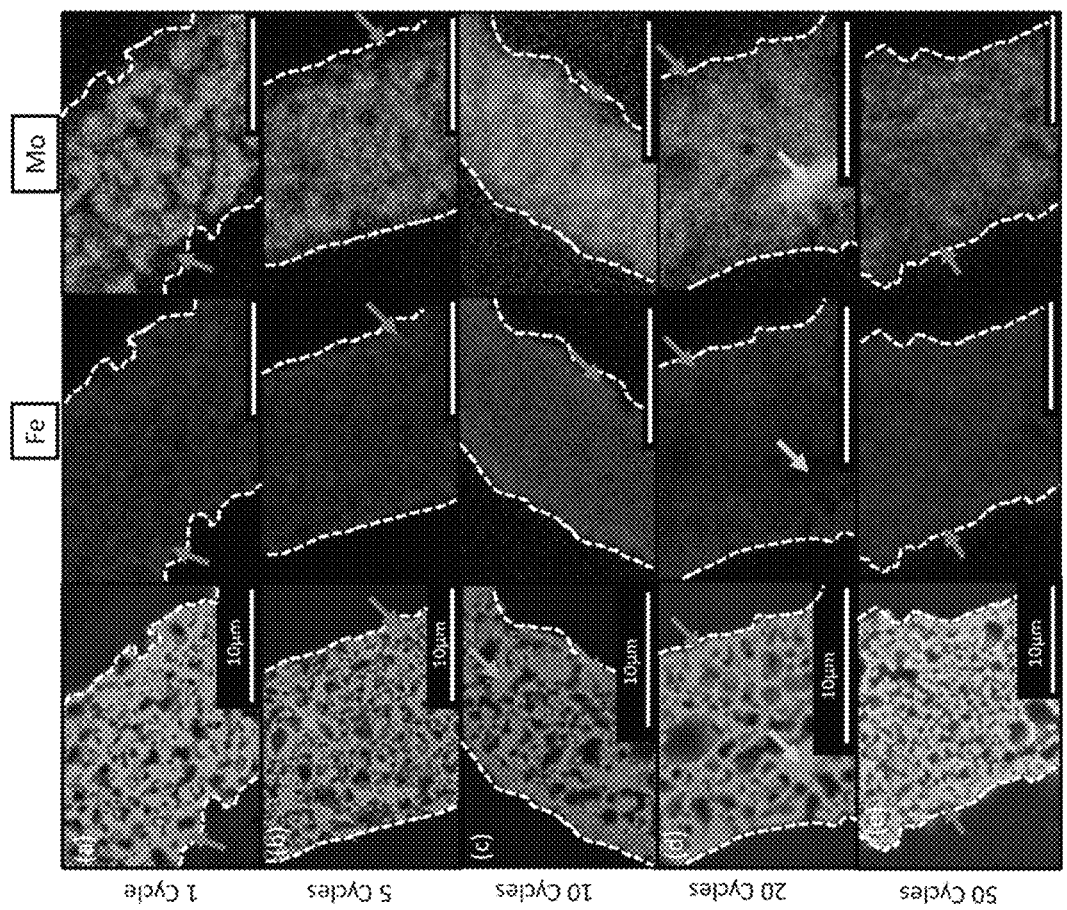

FIG. 11 shows SEM BSE imaging of lamellae cross sections after multiple consecutive redox cycles according to embodiments of the invention. Panel (a): 1 Redox cycle. Panel (b): 5 redox cycles. Panel (c): 10 redox cycles. Panel (d): 20 redox cycles. Panel (e): 50 redox cycles. EDS elemental maps are shown for Fe (Red) and Mo (Yellow). White dashed lines outline lamellae to help show compositional differences. Blue arrows indicate Fe-enrichment on the outside of lamellae, orange arrows indicate densified regions on the interior of the lamellae, and yellow arrows indicate Mo-enriched regions in the lamella interior.

Figure 12:
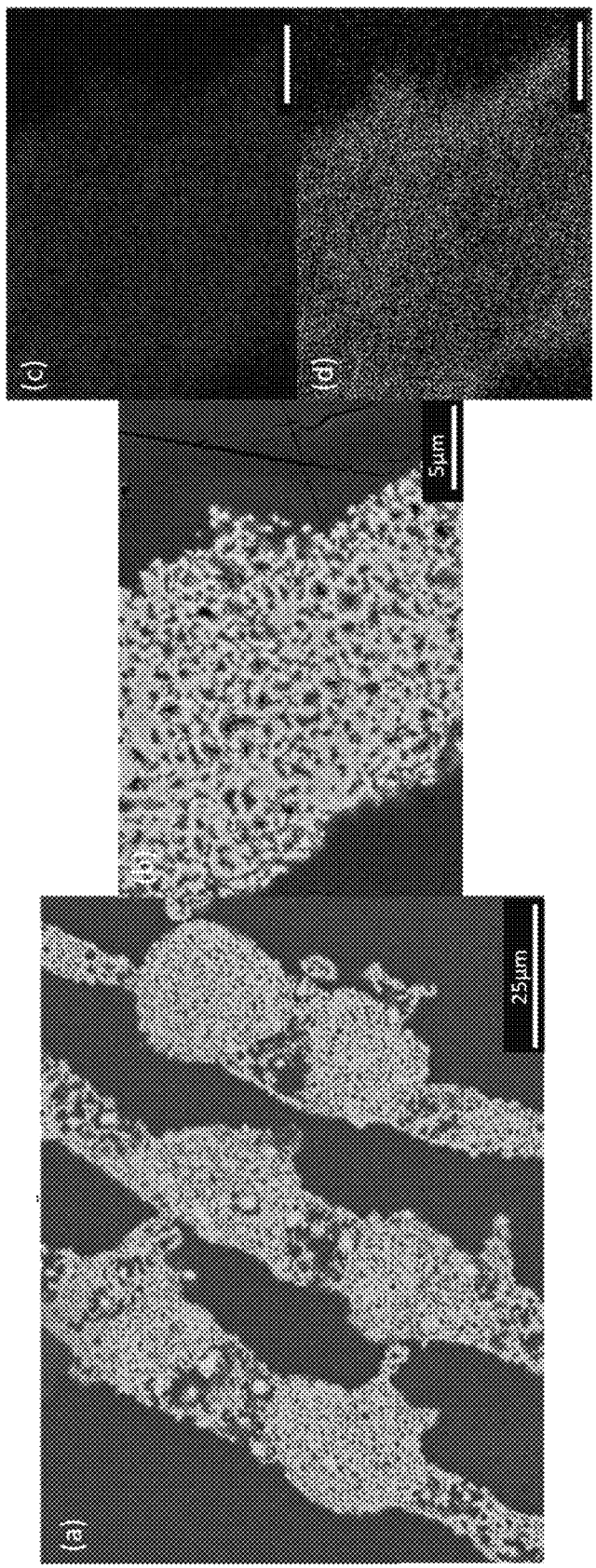

FIG. 12 shows examples of Bulb regions shown after 50 redox cycles in large wavelength foams according to embodiments of the invention. Panel (a): View of multiple bulb regions along the length of lamellae. Panel (b): High-magnification image of a bulb region. Panel (c): Corresponding Fe EDS map. Panel (d): Corresponding Mo EDS map.

Figure 13:
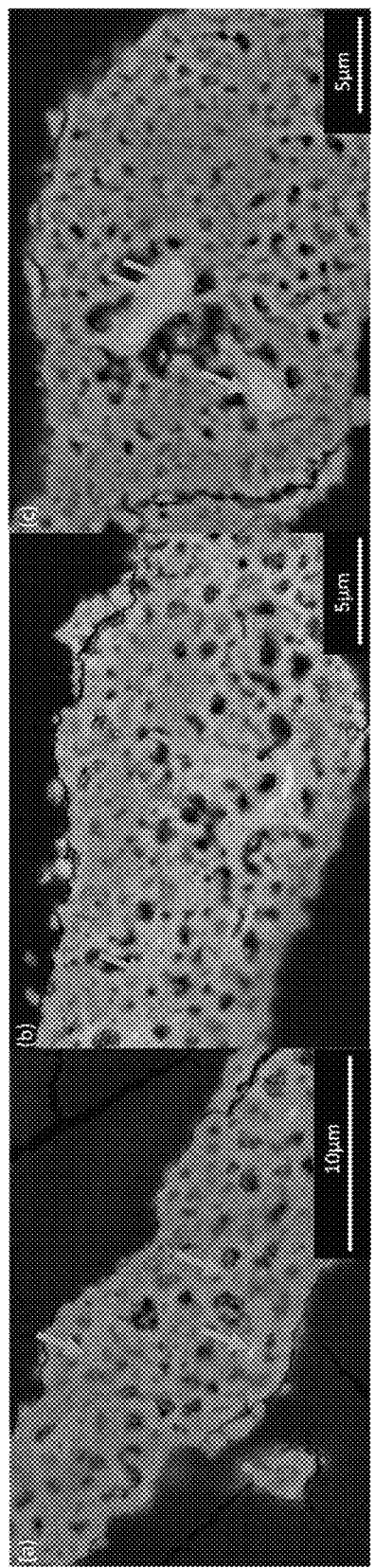

FIG. 13 shows oxidized microstructure after multiple consecutive redox cycles according to embodiments of the invention. Panel (a): Lamellae cross section after 30 redox cycle. Panel (b): Lamellae cross section after 50 cycles. Panel (c): Cross section after 50 cycles, highlighting bulb region. Blue arrows indicate examples of pores, orange indicate unoxidized Mo, and green Mo-rich regions identified by BSE contrast. Blue arrows indicate examples of pores, orange indicate unoxidized Mo, and green Mo-rich regions identified by BSE contrast. Orange arrows highlight metallic Mo, green arrows Mo-rich oxide regions, and blue arrows voids in the fully oxidized structure.

Figure 14:
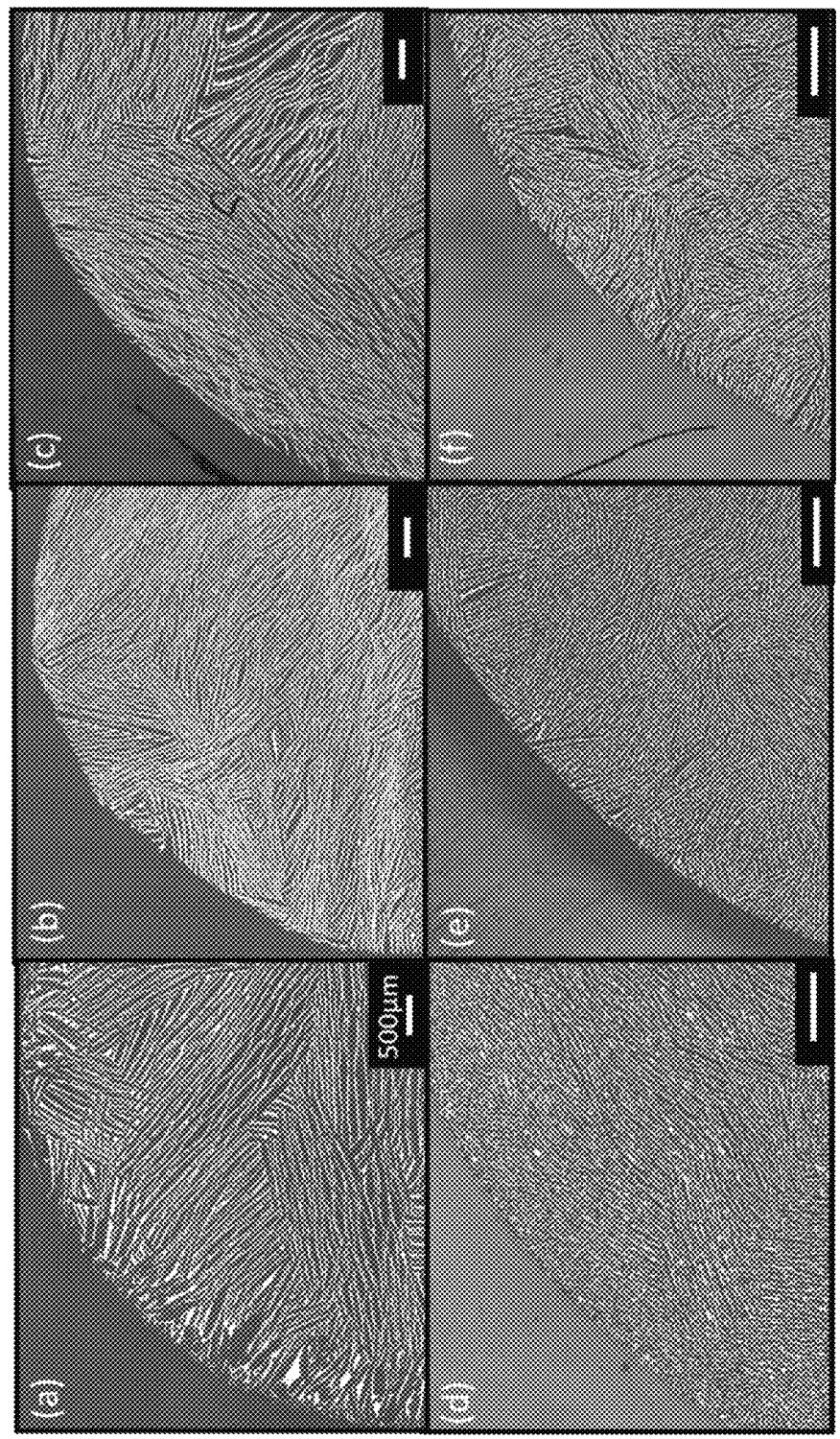

FIG. 14 shows stitched optical micrographs of Fe-25Mo lamellae after multiple redox cycles according to embodiments of the invention. Panels (a)-(c): $\lambda$=50 µm foams for 1, 5, and consecutive redox cycles, respectively, (d-f)) $\lambda$=30 µm foams for 1, 5, and 10 consecutive redox cycles, respectively.

Figure 15:
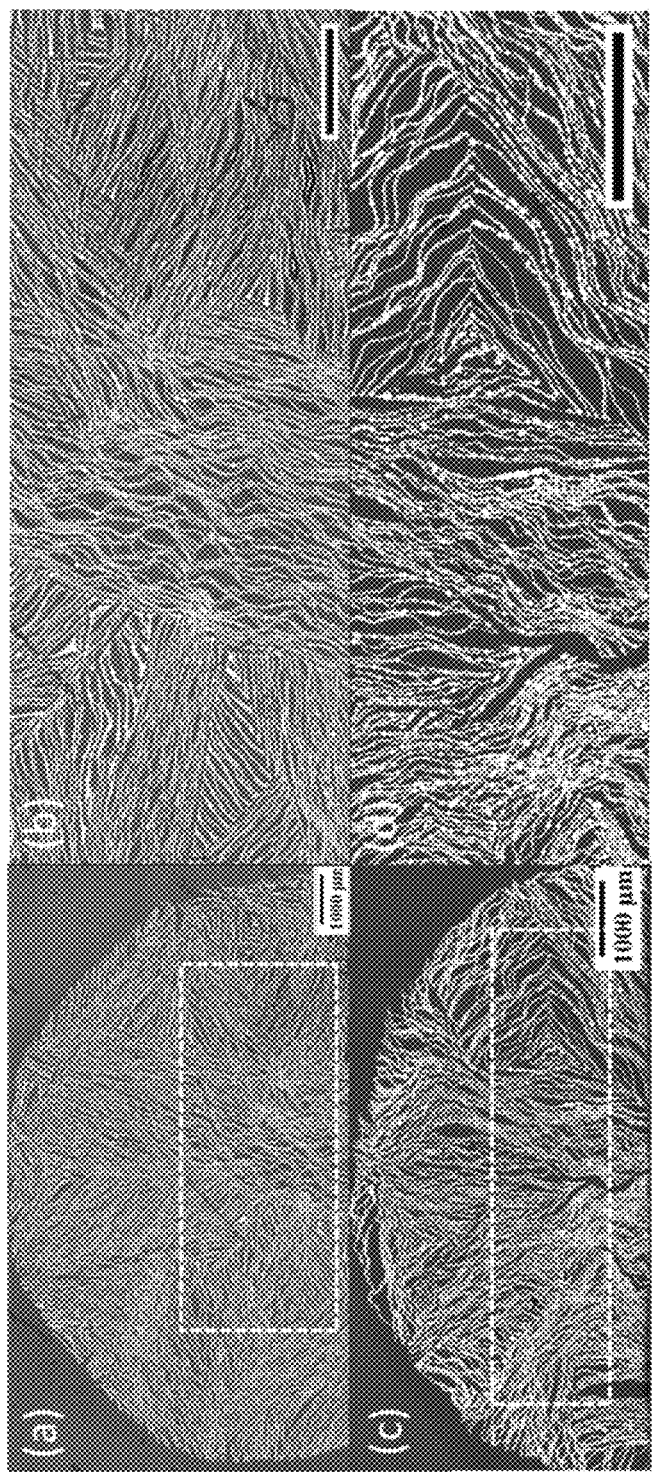

FIG. 15 shows stitched optical micrographs of Fe-25Mo ($\lambda$=50 µm) foams after long-term redox cycling according to embodiments of the invention. Panel (a): 20 cycle cross section. Panel (b): Magnified region, highlighting extreme lamellar buckling. Panel (c): 50 cycle cross section, (d) Magnified region, highlighting the onset of sintering, specifically at bulb regions.

Figure 16:
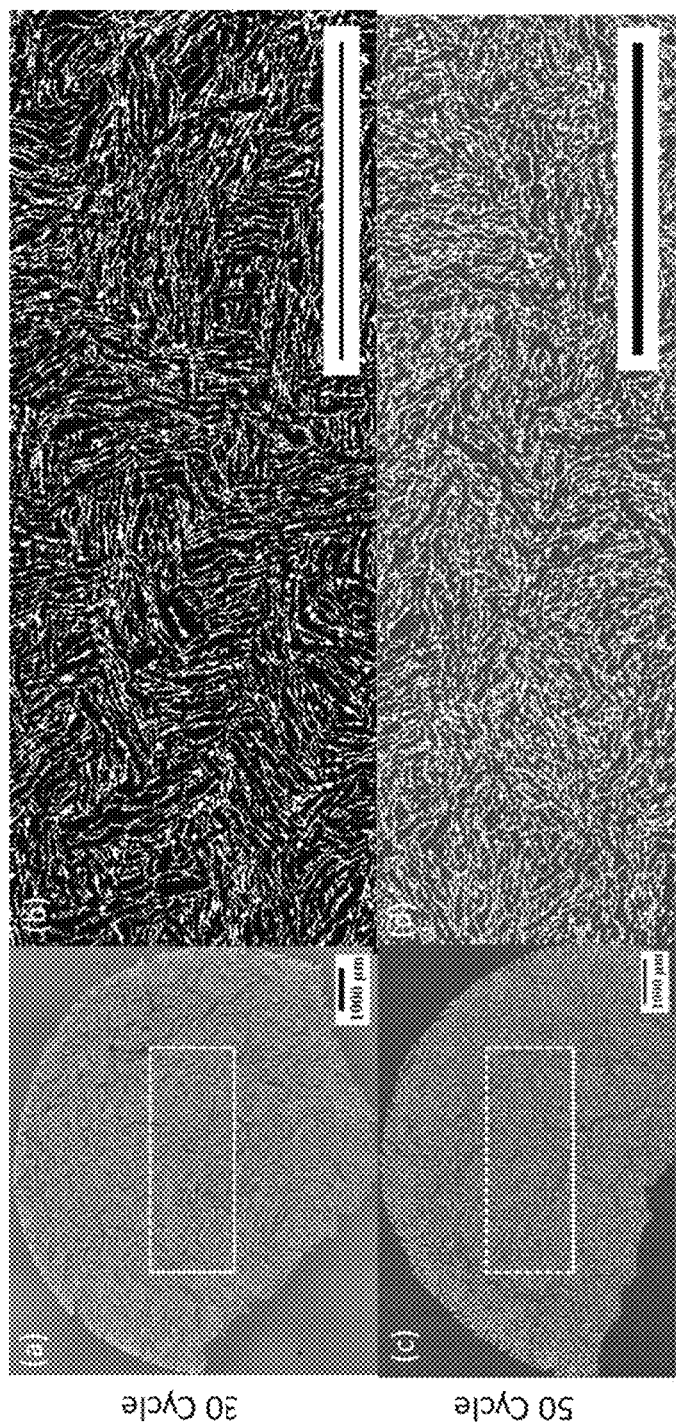

FIG. 16 shows stitched optical micrographs of Fe-25Mo $\lambda$=30 µm foams after long-term redox cycling according to embodiments of the invention. Panel (a): 30 cycle cross section. Panel (b): Magnified region, highlighting lack of lamellar buckling. Panel (c): 50 cycle cross section, (d) Magnified region, highlighting the lack of sintering.

Figure 17:
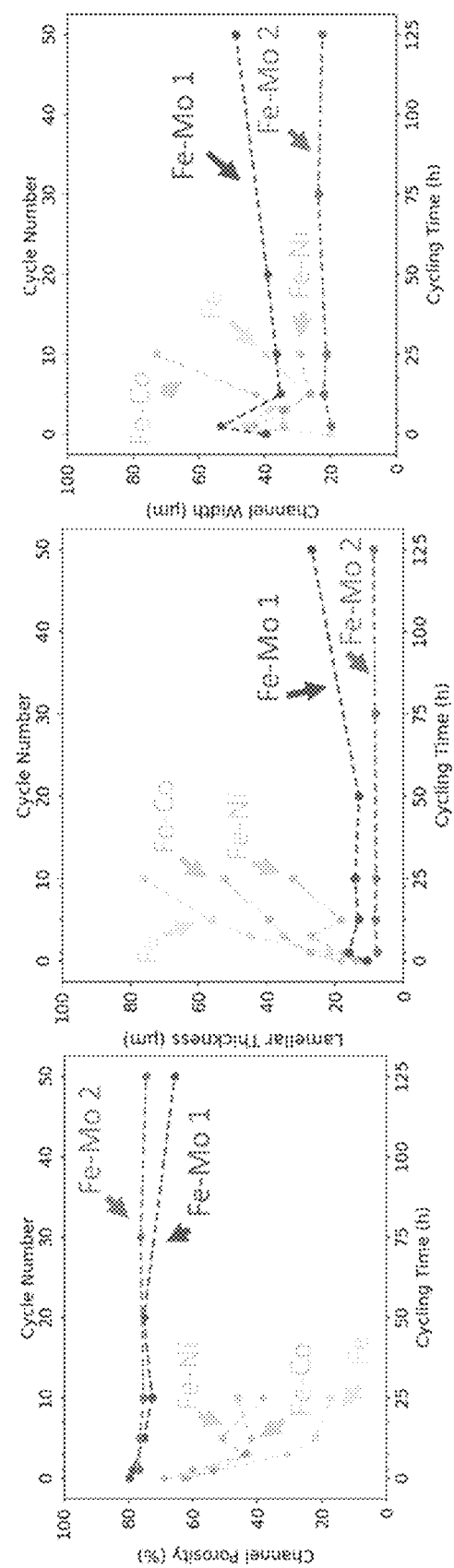

FIG. 17 shows quantified macrostructural degradation of Fe-25Mo foams over consecutive redox cycles according to embodiments of the invention. Panel (a): Channel porosity vs. cycle number. Panel (b): Lamellar thickness (µm) vs cycle number. Panel (c): Channel width (µm) vs cycle number. Each data point for Fe—Mo foams is an individual sample. Data for other alloy systems from. "Fe—Mo 1" represents foams with $\lambda$=50 µm, "Fe—Mo 2" foams with $\lambda$=30 µm.

Figure 18:
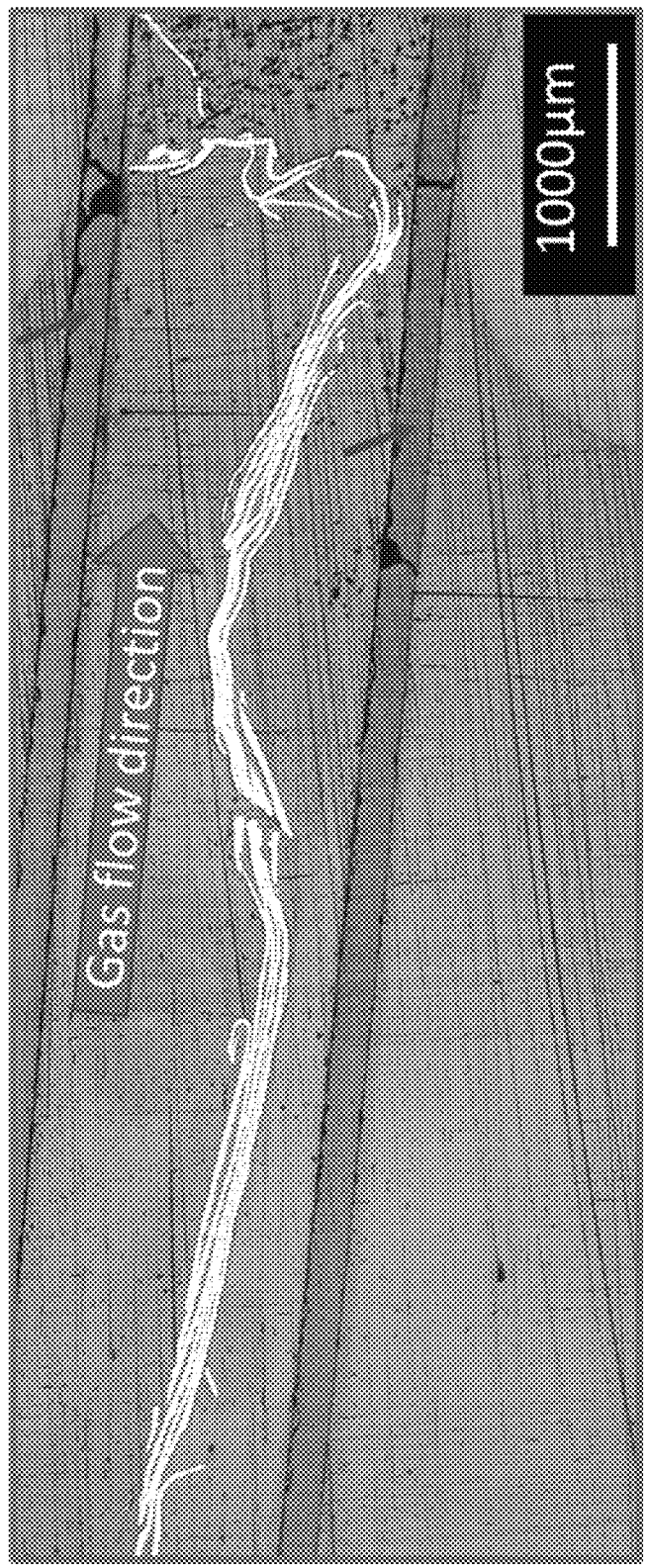

FIG. 18 shows representative cross section of Fe-25Ni lamellar foam portion (white) used in in-situ XRD, after 1 redox cycle according to embodiments of the invention. Red arrows point to wall of quartz capillary in which sample was enclosed. Gas flow direction indicated. The cross section shows that the lamellar structure is preserved for the in situ samples.

Figure 19:
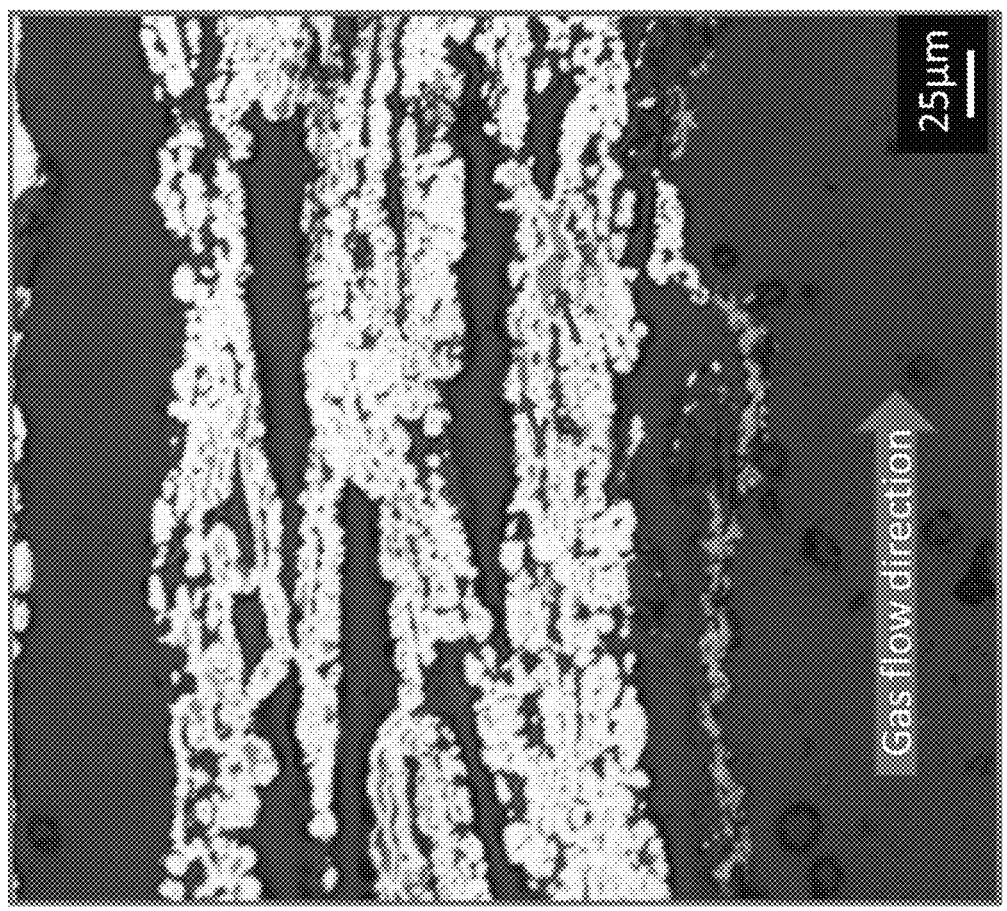

FIG. 19 shows representative cross section of lamellar Fe foam after 1 redox cycle in the in-situ XRD setup according to embodiments of the invention. Red arrows point to trapped oxide present after reduction. Gas flow direction indicated. The trapped oxide indicates that the degradation mechanisms present for the bulk foams are also present for the in situ samples, showing that the in situ testing is representative of bulk behavior.

Figure 20:
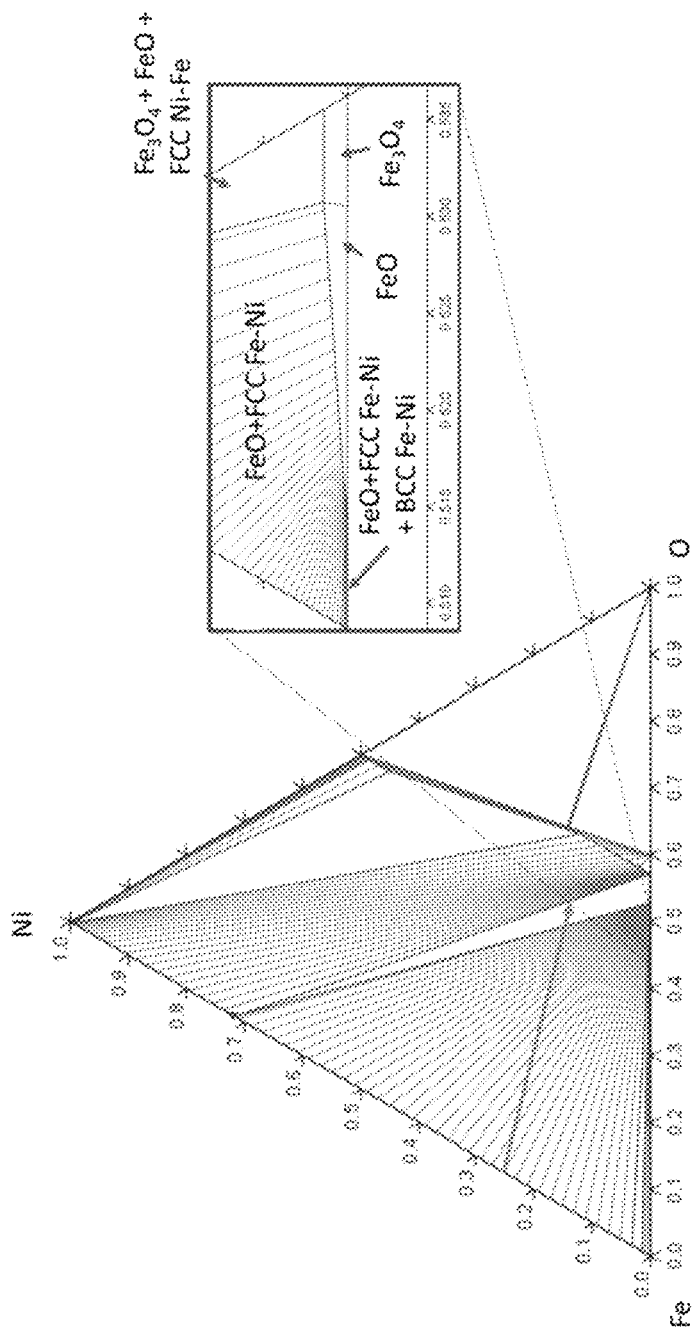

FIG. 20 shows Fe—Ni—O Ternary phase diagram (800° C. Isotherm) computed using Thermocalc according to embodiments of the invention. Axes are scaled in terms of mole fraction of component. The orange line highlights overall reaction pathway with constant Fe/Ni ratio and increasing O content. Magnified version highlighting FeO region (from −51.3 to 52.7 at % O) and tielines to the fcc-Fe(Ni) region.

Figure 21:
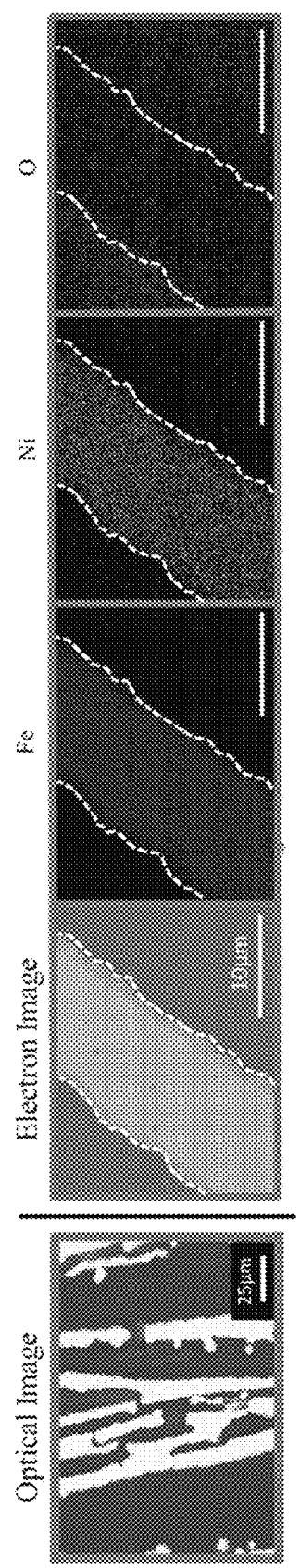

FIG. 21 shows cross-section micrographs (optical, SEM and EDS) of Fe-25Ni foam after reduction and sintering according to embodiments of the invention. These demonstrate homogenous distribution of Fe and Ni throughout the lamellae. Red arrows highlight examples of secondary dendrite arms.

Figure 22:
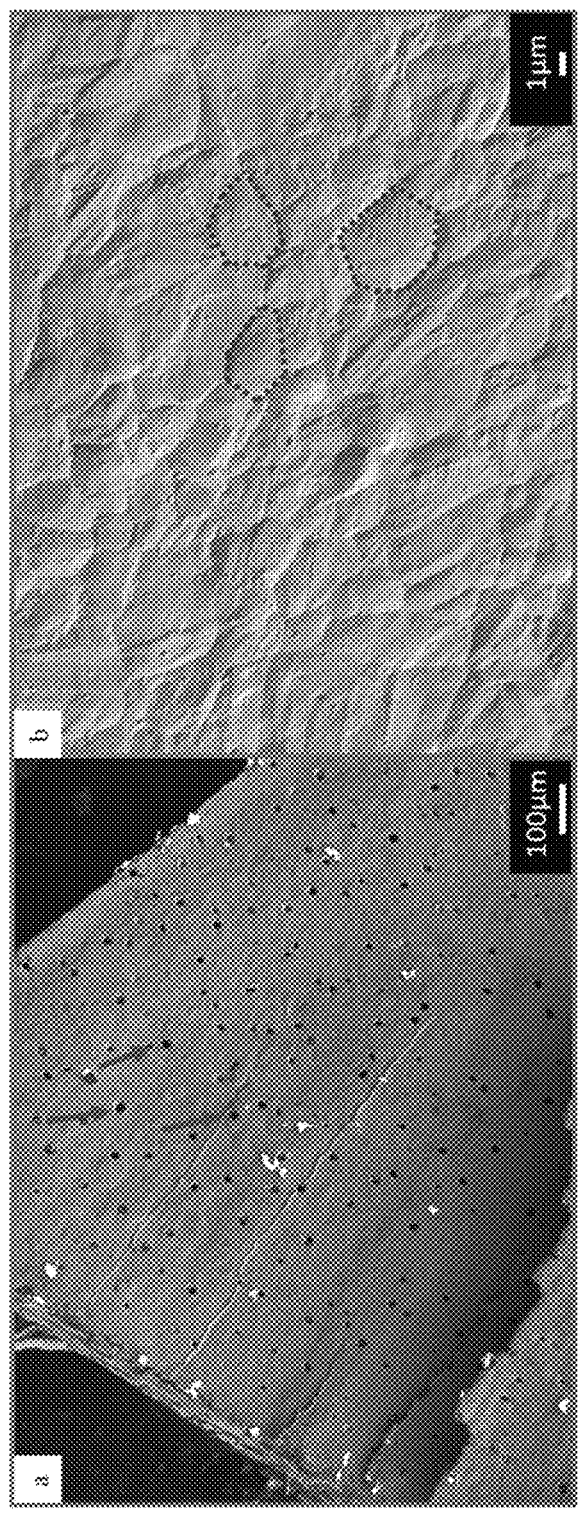

FIG. 22 shows SEM views of an Fe-25Ni lamella, in an as-fabricated foam after reduction and sintering according to embodiments of the invention. Panel (a): low-magnification view showing pores for steam egress/hydrogen ingress (black, three of which are highlighted with red arrows). Panel (b): high-magnification view (between pores) showing fine grain size, with red dashed lines outlining three grains visible on the surface.

Figure 23:
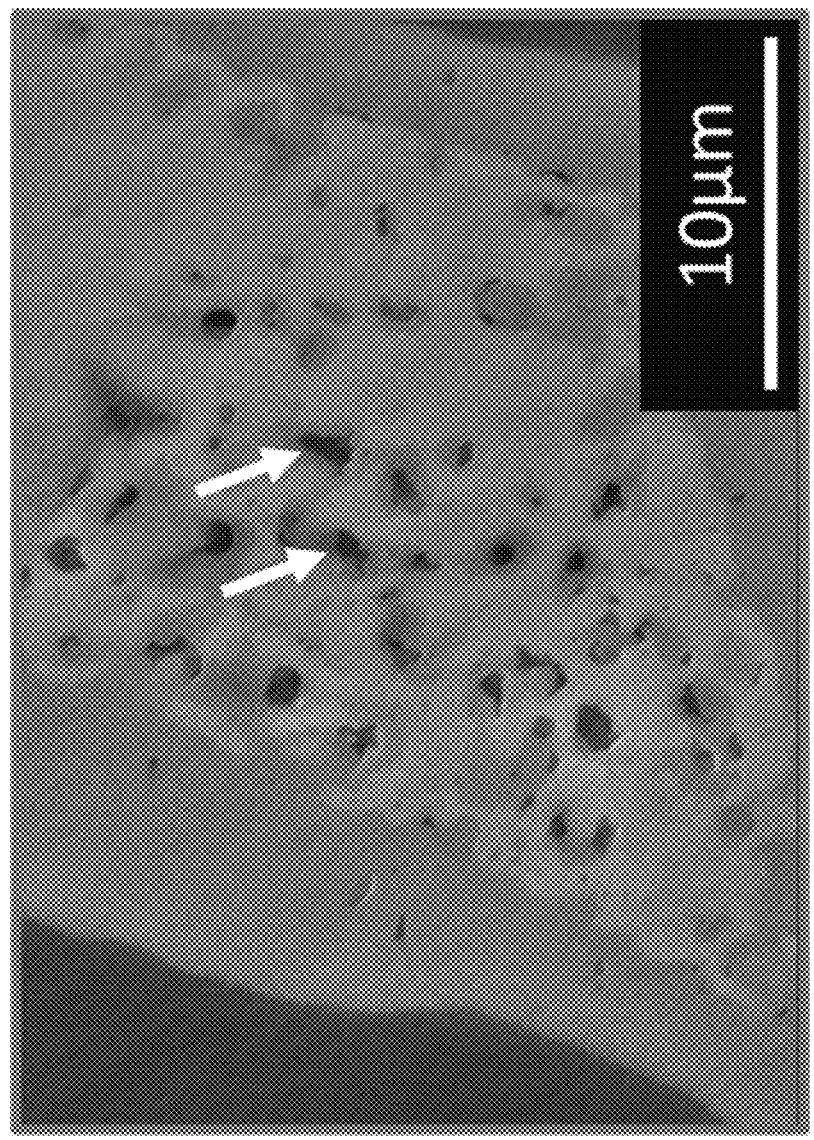

FIG. 23 shows cross section of an Fe-25Ni lamella imaged at the beginning of reduction while the oxide and metallic phases are both present, according to embodiments of the invention. White arrows highlight newly reduced microchannels which are partially filled with oxide, thus opening microchannel porosity which remains present after reduction.

Figure 24:
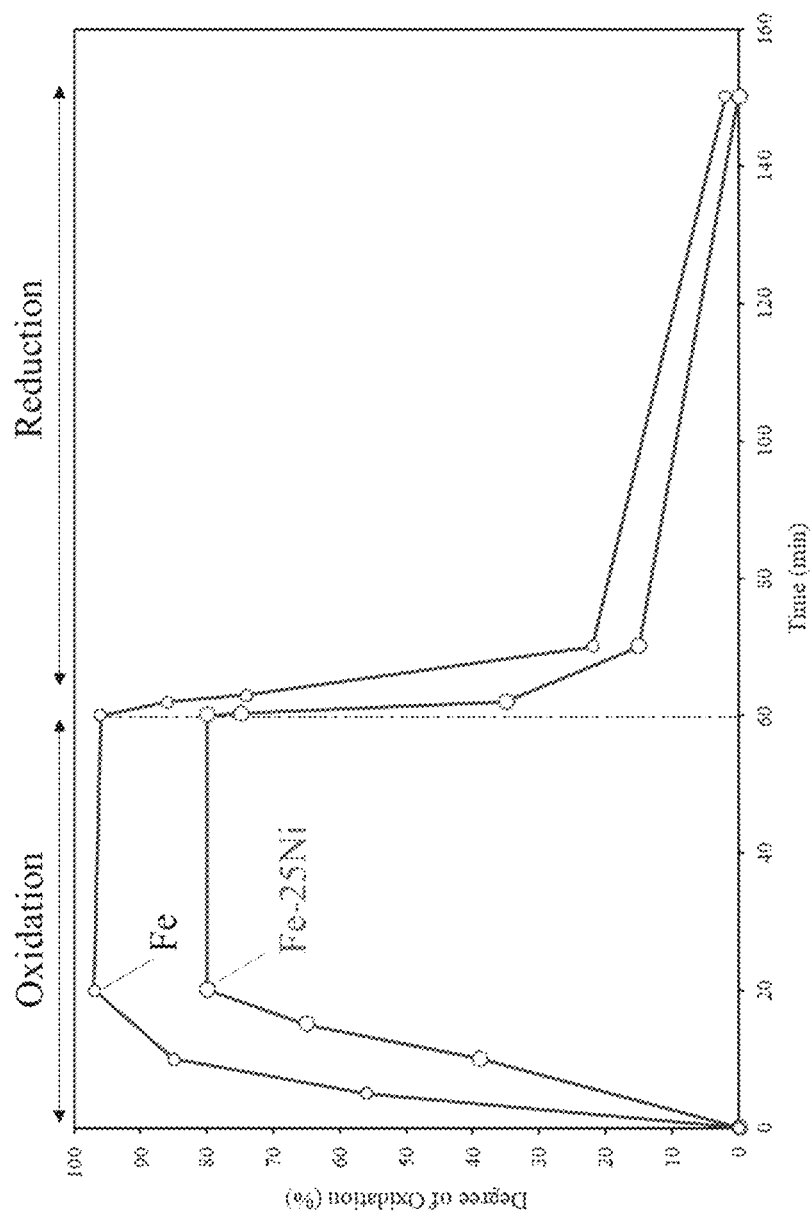

FIG. 24 shows degree of oxidation as measured by mass change for bulk Fe and Fe-25Ni foams according to embodiments of the invention. Fe-25Ni oxidizes more slowly than Fe, but also reduces much faster due to the reduction acceleration at the metal-oxide interface.

Figure 25:
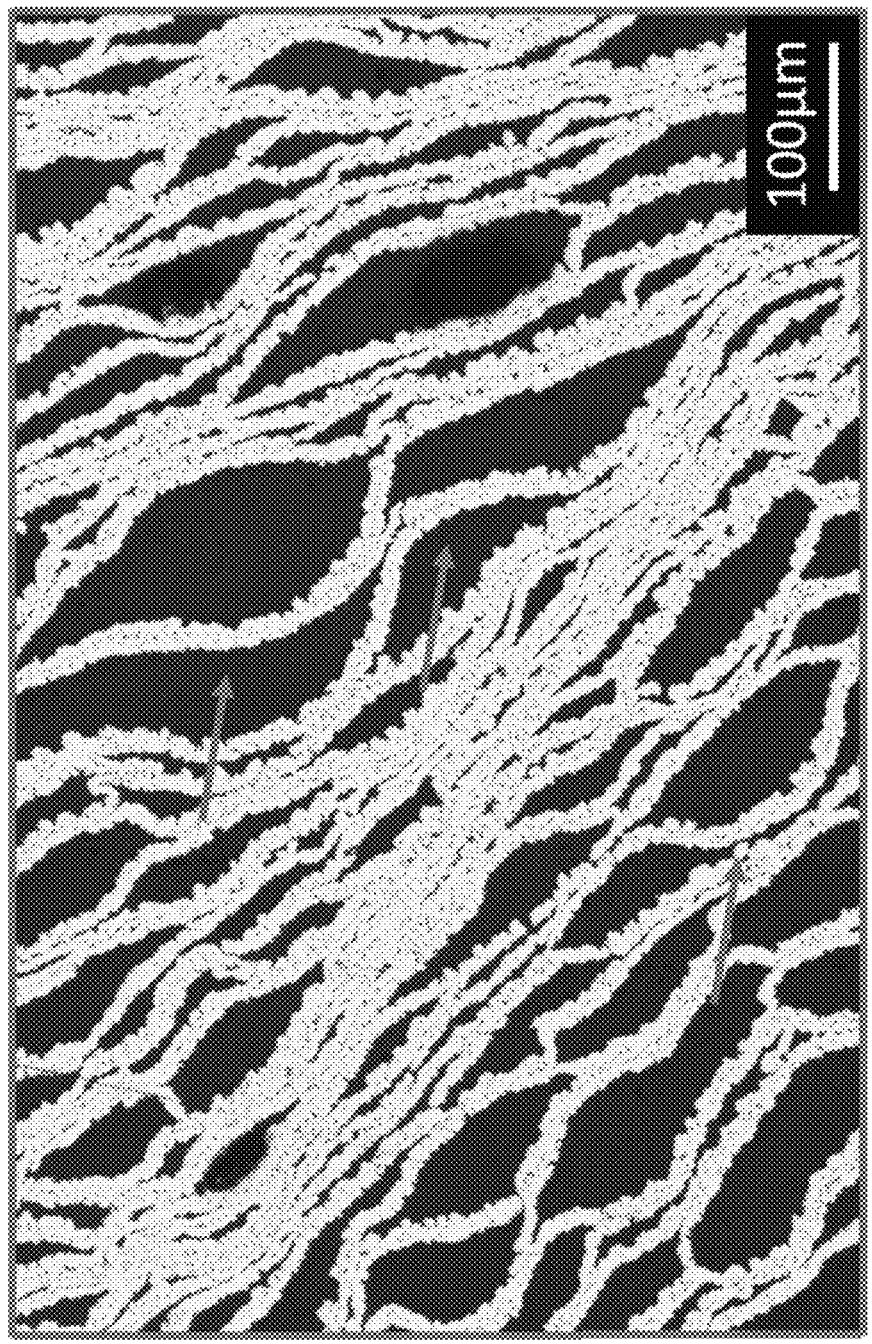

FIG. 25 shows micrograph of Fe-25Ni foam after 5 consecutive redox cycles according to embodiments of the invention. Blue arrows highlight extreme cases of buckling. All buckled lamellae have partially sintered with neighbors, often forming large, nearly-dense regions (as seen in the center of this micrograph). The kinetics of oxidation and reduction will be slower in this dense region due to poor gas access.

Figure 26:
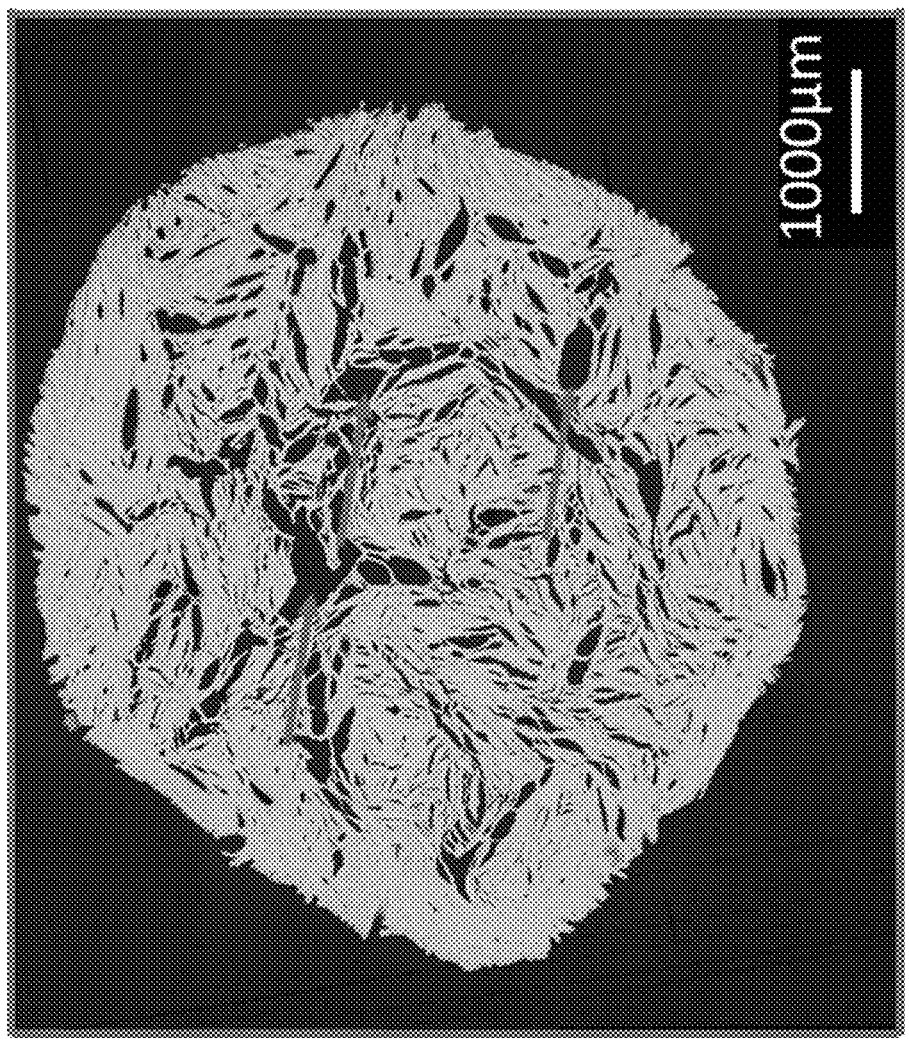

FIG. 26 shows micrograph of Fe foam after 10 consecutive redox cycles according to embodiments of the invention. Blue arrows highlight examples of sub-millimeter chambers created after lamellar buckling and corresponding sintering. The foam outer surface is sintered into a dense shell. This shell slows subsequent oxidation and reduction in the foam interior by limiting gas access.

Figure 27:
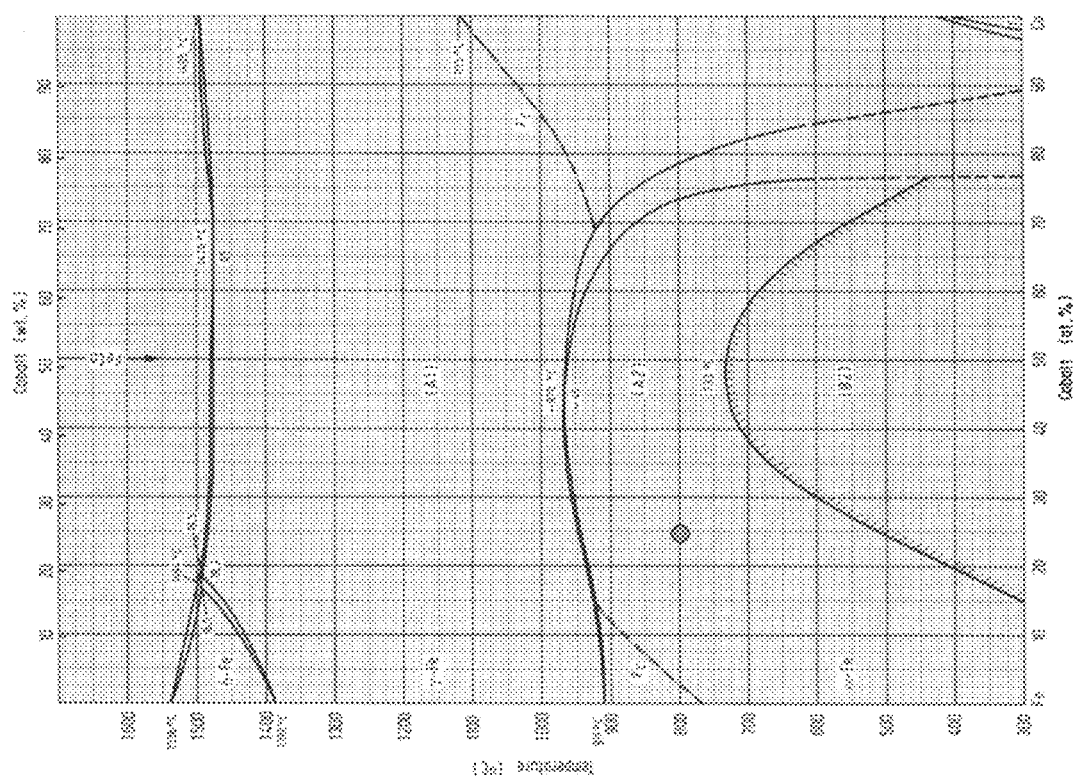

FIG. 27 shows binary phase diagram for Fe—Co metallic foam compositions in single-phase field for Fe-25Co according to embodiments of the invention.

Figure 28:
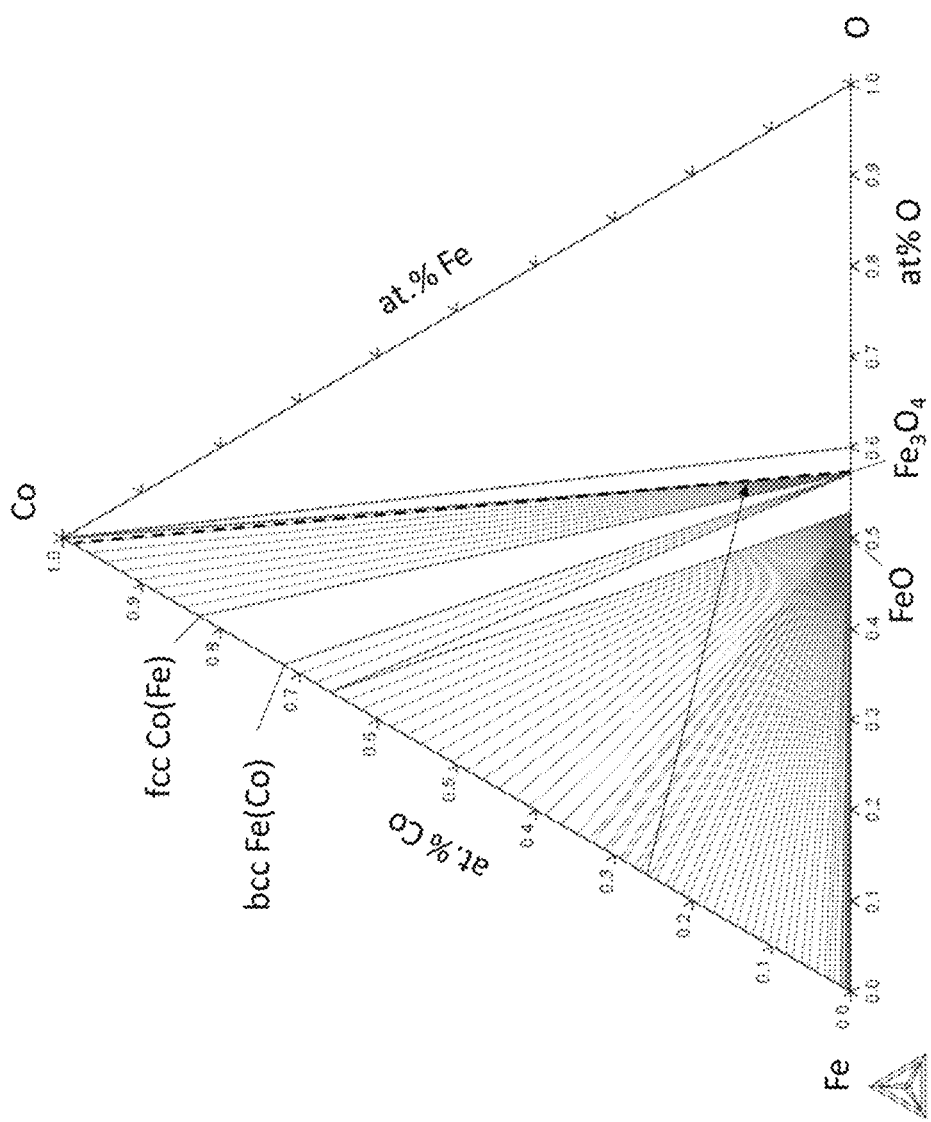

FIG. 28 shows ternary phase diagram for Fe—Co—O, calculated with Thermocalc at 800° C. according to embodiments of the invention. Black arrow indicates overall path of reaction (with constant Fe/Co ratio of 75/25 corresponding to Fe-25Co). The black dashed line indicates the tie line for the final composition, between Co-1Fe and $Fe_3O_4$.

Figure 29:
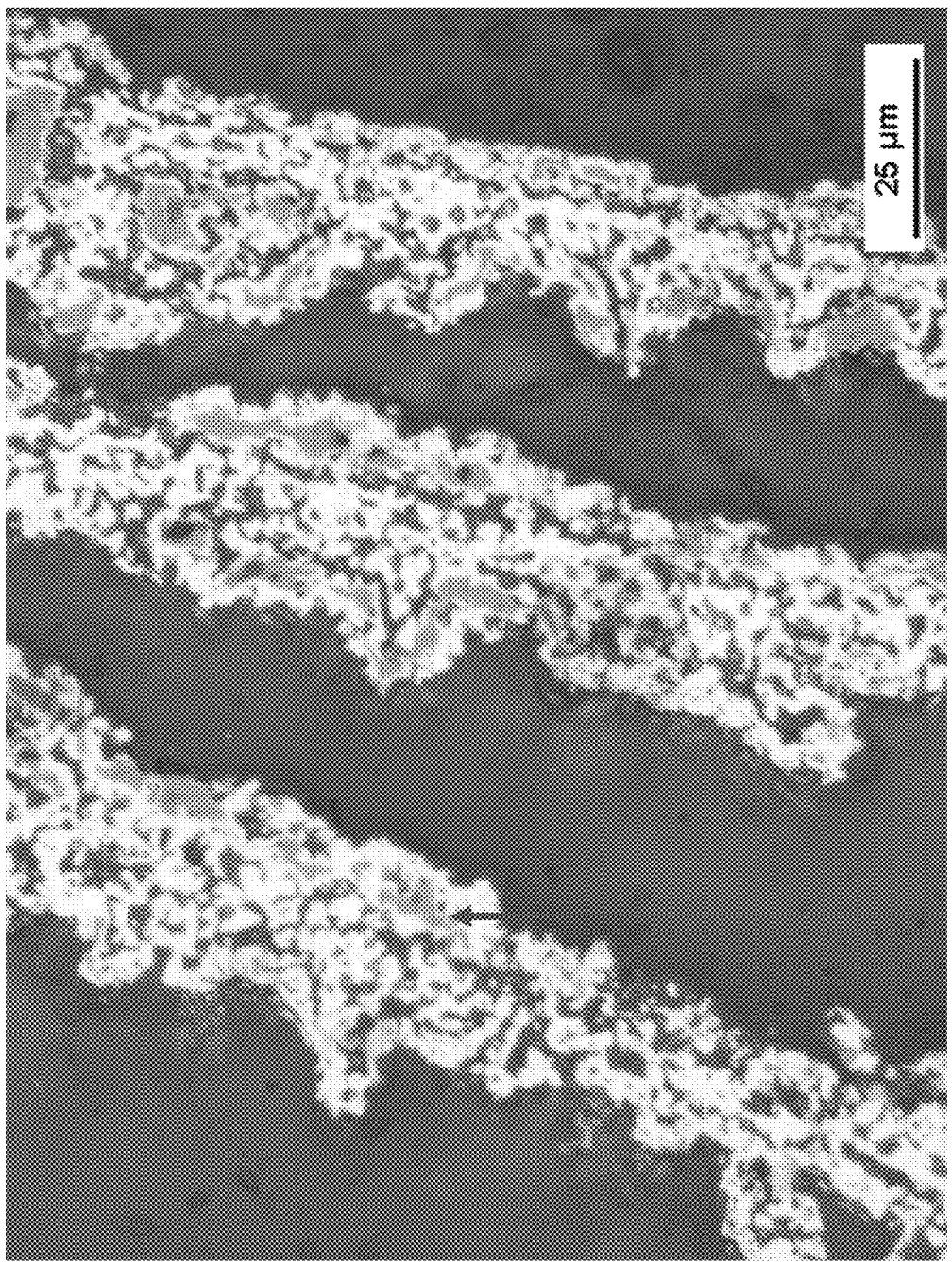

FIG. 29 shows FeO lenses encapsulated within Fe—Co matrix after 1 cycle of operando XRD for Fe-25Co according to embodiments of the invention. FeO lenses are dark gray, with one shown with a red arrow, Fe—Co matrix is white. Microporosity (black) is visible within the lamellae Entrapped oxide results in incomplete reduction in the in situ sample, indicating the degradation mechanism for the in situ sample is representative of the degradation mechanism for the bulk foam.

DETAILED DESCRIPTION OF THE INVENTION

The invention will now be described more fully hereinafter with reference to the accompanying drawings, in which exemplary embodiments of the invention are shown. However, this invention may be embodied in many different forms and should not be construed as limited to the embodiments set forth herein. Rather, these embodiments are provided so that this specification will be thorough and complete and fully convey the invention's scope to those skilled in the art. Like reference numerals refer to like elements throughout.

The terms used in this specification generally have their ordinary meanings in the art, within the context of the invention, and in the specific context where each term is used. Certain terms used to describe the invention are discussed below, or elsewhere in the specification, to provide additional guidance to the practitioner regarding the description. For convenience, certain terms may be highlighted, for example using italics and/or quotation marks. The use of highlighting has no influence on the scope and meaning of a term; the scope and meaning of a term are the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, or section without departing from the invention's teachings.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures. is turned over, elements described as being on the "lower" side of other elements would then be oriented on "upper" sides of the other elements. The exemplary term "lower", can, therefore, encompasses both an orientation of "lower" and "upper," depending on the particular orientation of the figure. Similarly, if the device in one of the figures is turned over, elements described as "below" or "beneath" other elements would then be oriented "above" the other elements. Therefore, the exemplary terms "below" or "beneath" can encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this specification, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification, and will not be interpreted in an idealized or overly formal sense unless expressly so defined herein.

As used in this specification, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in this specification, the phrase "at least one of A, B, and C" should be construed to mean a logical (A or B or C), using a non-exclusive logical OR. As used herein, the term "and/or" includes any and all combinations of one or more of the associated listed items.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in a different order (or concurrently) without altering the principles of the invention.

The iron-air redox system represents an inexpensive and theoretically high-capacity solution for grid-scale energy storage. However, this system is not currently viable because the initially high capacity quickly decreases due to the irreversible sintering and densification of iron particles when cycled as a packed powder bed.

To address this mechanism of degradation, by utilizing a water-based directional freeze casting process, iron-molybdenum foams are fabricated. The freeze-cast foam includes Fe-25Mo lamellae. This technology has two relevant components. First, the freeze-cast architecture is chosen to produce a highly porous metallic foam, with self-assembled gas flow channels that have an ideal morphology for gas flow reactions and with internal space to accommodate volumetric changes on oxidation. Second, the composition is chosen because Mo is known to be a sintering inhibitor, and has previously been used in packed powder beds to prolong the number of active cycles. In the Fe-25Mo freeze-cast foams, the Mo content is increased in order to induce hierarchical porosity: the freeze-cast channels provide mesoscale porosity for bulk gas flow, and the Mo content induces microscale porosity (within the lamellae) to prevent sample degradation by providing internal pores that the iron can fill on oxidation.

After sintering of the structure, the alloy displays a hierarchical porous structure that allows for ample gas flow, rapid reduction and oxidation reactions, and room for volumetric expansion and contraction upon redox cycling with steam and hydrogen, for use as an iron-air battery or as a hydrogen storage system. The novel architecture and composition achieve a significant reduction in structural degradation during high-temperature redox cycling as compared to state-of-the-art iron powder beds or iron foams.

Specifically, In one aspect, this invention relates to an iron-based foam usable for an electrochemical device, comprising: a composition comprising iron (Fe) and a refractory element processed to form the iron-based foam having a hierarchical porous structure with self-assembled channels for gas flow reactions and internal space to accommodate volumetric changes on oxidation.

In one embodiment, the iron-based foam is formed by directional, water-based freeze casting of the composition.

In one embodiment, the refractory element is adapted for sintering inhibition, thereby creating a hierarchical porous structure which promotes reactivity and allows for fracture to not affect bulk lamellar integrity.

In one embodiment, the refractory element comprises molybdenum (Mo), molybdenum (Mo), tungsten (W), tantalum (Ta), niobium (Nb), or vanadium (V).

In one embodiment, Mo is in a range of 10-50 at %, and Fe is in balance in the iron-based foam.

In one embodiment, Mo is 25 at % in the iron-based foam.

In one embodiment, in the Fe-25Mo freeze-cast foam, the Mo content is increased in order to induce hierarchical porosity: the freeze-cast channels provide mesoscale porosity for bulk gas flow, and the Mo content induces microscale porosity within the lamellae to prevent sample degradation by providing internal pores that the iron can fill on oxidation.

In one embodiment, the Fe-25Mo freeze-cast foam, when subjected to steam-hydrogen redox cycling at about 800° C., is much more damage- and sintering-resistant than Fe, Fe-25Ni and Fe-25Co foams, and after 50 redox cycles at about 800° C., the Fe-25Mo freeze-cast foam maintains at least 80% of its initial porosity.

In one embodiment, the iron-based foam has three distinct phases: (i) $\alpha$-Fe(Mo) solid solution with a BCC crystal structure, (ii) Fe-rich $\mu$-phase, composition close to $\mu$-Fe$_3$Mo$_2$, and (iii) mixed Fe—Mo carbide, Fe$_3$Mo$_3$C, with a FCC crystal structure.

In one embodiment, the iron-based foam is a combination of the $\alpha$-Fe(Mo) phase, representing 51.5 mol %, the $\mu$-Fe$_3$Mo$_2$ phase, representing 45.1 mol %, and Fe$_3$Mo$_3$C representing 3.4 mol %.

In one embodiment, the carbon comes from the binder burnout during the reduction and sintering process, with an initial carbon content of 0.49 wt. %.

In one embodiment, within the microstructure, the phases are presented in two distinct regions representing a Fe-rich region and a Mo-rich region.

In one embodiment, during redox cycling with steam and hydrogen, respectively, the iron-based foam undergoes reversible oxidation and reduction, without internal damage, because of its hierarchical microstructure and the sintering inhibition provided by Mo.

In one embodiment, the composition further comprises at least one of tungsten (W) and nickel (Ni).

In one embodiment, the iron-based foam is a hierarchically porous foam including: wide channels between neighboring lamellae, which operably provide gas access to lamellae, into and out of the foams and accommodate lamellar expansion and contraction without interlamellar contact and sintering, thereby preventing macroscopic foam densification; and/or microporosity within lamellae, which operably provides additional gas access and free volume to accommodate the volumetric expansion of lamellae during oxidation, thereby limiting the radial expansion of lamellae, lowers the diffusion distances during oxidation, thereby accelerating kinetics and limiting formation of Kirkendall pores, and provides additional Kirkendall pore sinks, thereby preventing large-scale cracking of lamellae.

In another aspect, the invention relates to an electrochemical device comprising at least one iron-based foam disclosed above.

In one embodiment, the electrochemical device comprises an iron-air battery, or a hydrogen storage system.

In yet another aspect, the invention relates to a method of forming an iron-based foam usable for an electrochemical device, comprising mixing water, dispersant, binder, and powder precursors to form a suspension thereof; ball milling the suspension; and freezing the ball milled suspension directionally; sublimating the frozen suspension, leaving behind a porous green body, which is reduced with hydrogen to a Fe—Mo porous lamellar alloy; and sintering partially densifies the Fe—Mo lamellae, leading to a lamellar foam comprising colonies of aligned, porous lamellae separated by gas-flow channels.

In one embodiment, the dispersant comprises propylene glycol or sodium polyacrylate.

In one embodiment, the binder comprises polyethylene glycol (PEG), polystyrene (PS), or any other water soluble polymer such as polyvinyl alcohol (PVA).

In one embodiment, the powder precursors comprises $Fe_2O_3$, $Fe_3O_4$, or FeO and $MoO_3$, or any metal powders Fe and refractory metal powders Mo, W, Ta, Nb, V and their oxides, and any mixed oxides, mixed metals, or mixed metals and oxides, or any other compound beyond oxides (hydrides, carbides, nitrides) that can be reduced to form a metallic precursor, and any mixtures of the above. It should be noted that the freeze casting method can be generally applied to any powder including oxides, nitrides, carbides, hydrides, or plain metallic powders. Any of these could be processed to produce freeze cast structures.

In one embodiment, the suspension comprises about 10 vol % oxide powders, 2 vol % binder, and 0.5 vol % dispersant.

In one embodiment, after sintering of the structure, the iron-based foam has a hierarchical porous structure that allows for ample gas flow, rapid reduction and oxidation reactions, and room for volumetric expansion and contraction upon redox cycling with steam and hydrogen.

Specifically, in some examples, steam-hydrogen redox cycling, relevant to grid-scale energy storage, is studied at 800° C. for Fe-25Mo (at %) foams featuring colonies of parallel lamellae separated by channels (~10 and ~30 μm wide, respectively), manufactured by directional freeze-casting of a blend of iron- and molybdenum oxide powders, reduction to metallic Fe+Mo, and sintering. Foams show a high structural damage resistance during cycling, stemming from the sintering inhibition of Mo, which creates a hierarchically porous foam. This leads to (i) wide channels between lamellae, yielding a very high macroscopic porosity (~78%) which can accommodate volumetric expansion to prevent lamellar contact, sintering, and densification, and (ii) microporosity within lamellae, providing additional gas access and volume for the oxide to expand into, limiting expansion of the lamellae, and limiting the formation of Kirkendall pores through lower diffusion distances and providing additional Kirkendall pore sinks. The ability for Mo to undergo redox concurrently with Fe gives a high reaction reversibility. This yields a multi-phase oxide lamellae ($Fe_3O_4$+$MoO_2$+$Fe_2Mo_3O_8$) at full oxidation, which are nearly-dense and resistant to cracking. Subsequent hydrogen reduction produces two-phase metallic lamellae ($\alpha$-Fe(Mo)+ $\lambda$-$Fe_2Mo$) with high open porosity, increasing subsequent oxidation rates. These combined effects of Mo in Fe-25Mo foams enable a near-complete reversibility of microstructure during redox cycling—preventing damage produced via internal lamellar buckling, cracking, contacting and sintering—with a remarkably high porosity (65%) remaining after 50 consecutive redox cycles.

The invention may have widespread applications in, but not limited to, solid-oxide iron-air flow batteries (reversible, multi cycles), chemical looping combustion reactor, hydrogen generator (water splitting), hydrogen storage, and the likes.

Among other things, the invention provides at least the following advantages: the foam is formed of inexpensive, non-toxic, earth-abundant materials (iron and molybdenum oxides), with scalable processing technique, and cheap, clean processing (water carrier and sintering). The foam has hierarchical porous structures. The freeze-cast architecture prolongs the number of usable cycles for the active material by mitigating particle sintering. In addition, previous solutions using the Fe—Mo system have consisted of packed Fe+Mo powder beds without a controlled microstructure or architecture, the freeze-cast structure described here consists of a hierarchical porous structure designed to allow for expansion and contraction such that the active material remains easily accessible to gas for many cycles.

These and other aspects of the invention are further described below. Without intent to limit the scope of the invention, exemplary instruments, apparatus, methods, and their related results according to the embodiments of the invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Example 1

Structural Stabilization of Fe-Based Freeze-Cast Foams During Redox Cycling Via Elemental Alloying: Iron-Molybdenum System As previous explored, the alloy systems of Fe—Ni and Fe—Co display an ability to mitigate rapid onset degradation issues, however, both eventually succumb to the same degradation mechanism: mechanical buckling and associated densification due to interlamellar contact driven by volumetric changes. Thus, investigating an alloying element with higher mechanical strength and higher sintering resistance, which is correlated with the melting temperature, holds significant interest.

In this exemplary example, Mo is chosen as an element that features a stable oxide that can be readily reduced under $H_2$, consistent with the freeze casting methodology for Fe, Ni, and Co explored up to this point. Additionally, Mo has been explored as a catalyst and for Fe redox, albeit in significantly lower molar fractions. Fe-25Mo is chosen as the test composition due to the previous success of alloying with 25 at % Ni and Co, ensuring there is enough Mo, beyond the percolation limit, present to have a significant effect on the microstructural evolution.

As-Sintered Structure

Figure 1:
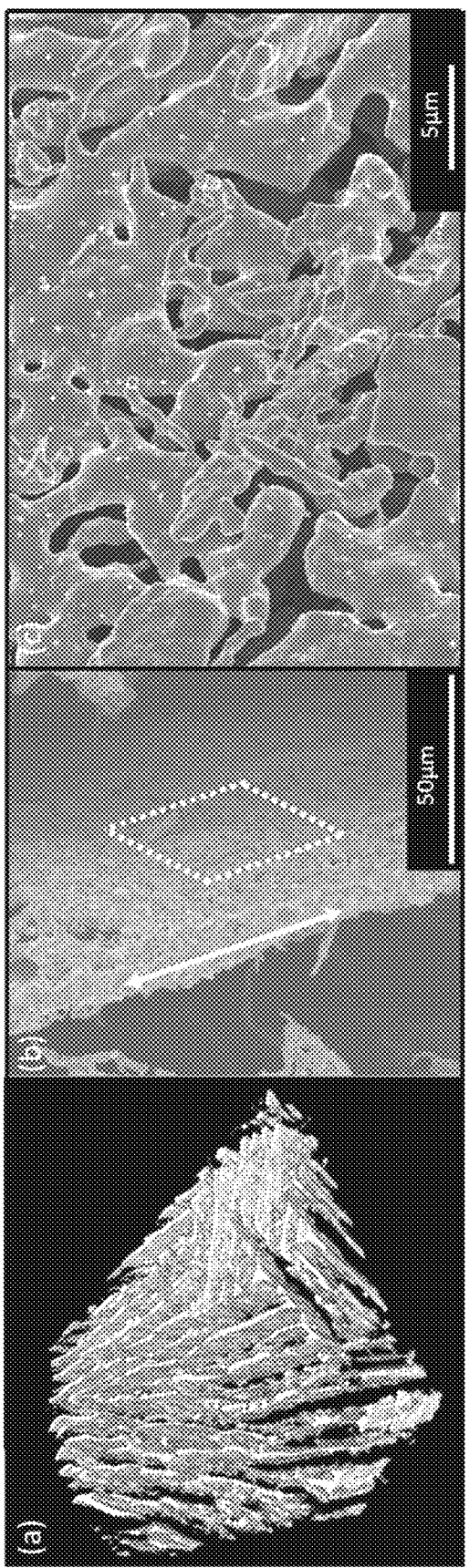
FIG. 1 shows SEM Images of Fe-25Mo lamellae after reduction and sintering according to embodiments of the invention. Panel (a): Subsection of tomographic reconstruction (height of reconstructed region is 180 μm) showing lamellae and channels. Panel (b): Porous lamellar wall from an Fe-25Mo foams as-sintered, white arrow highlights freezing direction. Panel (c): Side on view of lamellar wall (example section shown as dashed square in panel (b)), with orange circles highlighting needle like regions.

Fe-25Mo foams are subject to the same sintering program as Fe, Fe—Ni, and Fe—Co foams explored previously (3.5 h at 1000° C.), preventing further nominal sintering during cycling at 800° C. The resulting foams feature, flat, unbuckled lamellae, as shown in panel (a) of FIG. 1, owning to the higher mechanical strength provided by Mo, as compared to unalloyed Fe, allowing the Fe—Mo lamellae to resist plastic deformation during reduction and sintering. Fe-25Mo foams also show significant sintering inhibition as compared to previously explored systems, where the diameter of the foam shrinks from the green body diameter of 15 mm to 11.5-12 mm after sintering, as compared to 8.5-9 mm for Fe, Fe—Ni, and Fe—Co foams. Sintering inhibition extends to the foam microstructure, where lamellar walls are only partially sintered, as shown in panel (b) of FIG. 1, creating a hierarchical porous structure. Parallel to the freezing direction, needle-like structures are also seen within the lamellae, as highlighted in orange in panel (c) of FIG. 1. Submicron white particles are observed in EDS to be rich in Si, Mg, and Al. These are expected to be oxide impurities present in the initial pure oxide precursor particles, which have been reported previously; as such, they are inert to the redox reactions studied here.

Figure 2:
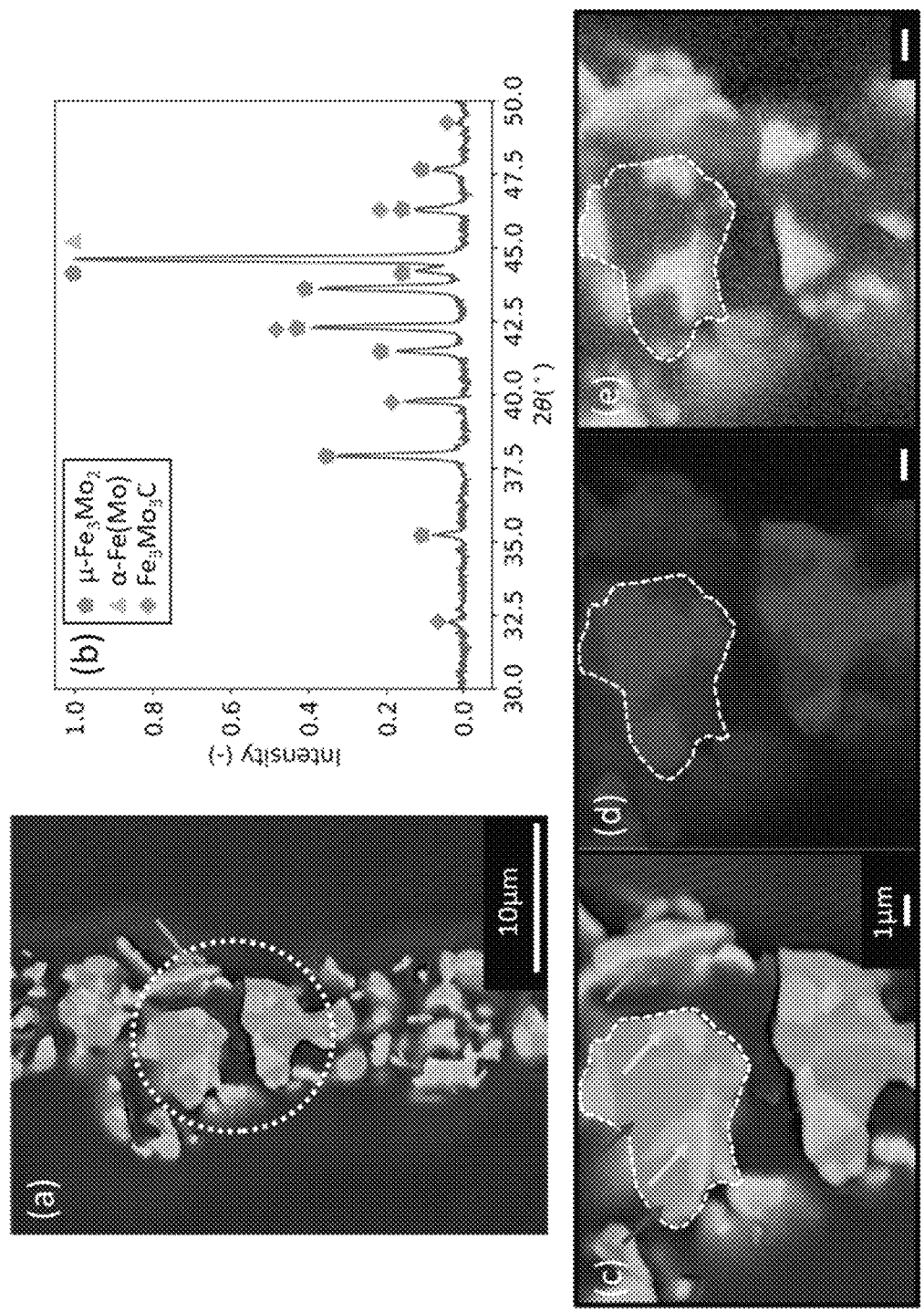
FIG. 2 shows the chemical structure of Fe-25Mo lamellae after reduction and sintering according to embodiments of the invention. Panel (a): Cross sectional view of Fe-25Mo lamellae. Panel (b): Background-corrected XRD pattern of Fe-25Mo foam, highlighting presence of an Fe-rich α-Fe (Mo) phase, μ-$Fe_3Mo_2$ (Rhombohedral), and $Fe_3Mo_3C$ (FCC). Panel (c): Zoomed in SEM BSE image of lamellae. Panel (d): Fe elemental map, recovered from EDS. Panel (e): Mo EDS elemental map. Red arrows highlight examples of α-Fe(Mo) regions, Yellow arrows μ-$Fe_3Mo_2$ and/or $Fe_3Mo_3C$, and green needle-shaped regions.

The hierarchical porous structure is highlighted by a lamellar cross section, shown in panel (a) of FIG. 2; backscattered imaging in SEM reveals regions of differing chemical composition, noted by variations in contrast. XRD shows the presence of three distinct phases: (i) $\alpha$-Fe(Mo) solid solution with a BCC crystal structure, (ii) Fe-rich $\mu$-phase, composition close to $\mu$-Fe$_3$Mo$_2$ (isostructural with $\mu$-Fe$_7$W$_6$), and (iii) mixed Fe—Mo carbide, Fe$_3$Mo$_3$C, with a FCC crystal structure (panel (b) of FIG. 2). The foam is a combination of the $\alpha$-Fe(Mo) phase, representing 51.5 mol %, the $\mu$-Fe$_3$Mo$_2$ phase, representing 45.1 mol %), and Fe$_3$Mo$_3$C representing 3.4 mol %.

The carbon comes from the binder burnout during the reduction and sintering process, which has not been seen in previous Fe foams, as confirmed by chemical analysis (Westmoreland Mechanical Testing & Research). This creates an initial carbon content of 0.49 wt. %. Within the microstructure, these phases are seen in two distinct regions representing a Fe-rich region (panel (c) of FIG. 2 red arrows, panel (d) of FIG. 2) and a Mo-rich region (panel (c) of FIG. 2 yellow arrows, panel (e) of FIG. 2). The $\mu$-Fe$_3$Mo$_2$ and Fe$_3$Mo$_3$C exhibit the same contrast under BSE due to similar average Z values. In larger sintered regions, typically 5-10 $\mu$m in diameter, these phases contact to form interfaces between $\alpha$-Fe(Mo)+($\mu$-Fe$_3$Mo$_2$/Fe$_3$Mo$_3$C). This is consistent with the expected equilibrium between Fe and Mo at the sintering temperature, where $\alpha$-Fe(with Mo in solid solution) exists in equilibrium with an Fe-saturated $\mu$-Fe$_3$Mo$_2$. The three-phase composition can be expected to contribute significantly to the sintering inhibition, as the distinct phases limit diffusion across the entire lamellae, unlike single-phase Fe, Fe—Ni and Fe—Co foams previously studied. The needle-like regions seen previously are found to be Mo-rich, highlighted by green arrows in panels (a) and (c) of FIG. 2, and thus are most likely $\mu$-Fe$_3$Mo$_2$, given the rhombohedral crystal structure of the $\mu$-phase.

Oxidation of Fe-25Mo Foams

In-Situ XRD: To investigate the chemical and crystallographic changes upon redox cycling of Fe—Mo foams, in-situ XRD was performed, revealing phases present, rate-limiting steps, and shifts in lattice parameters to determine changes in chemical composition of solid-solution phases. The acquisition time was increased from 12 to 60 s, as compared to previous in-situ work; the five-fold longer exposure time was necessary to resolve peaks due to increased absorption from heavy Mo. To slow reactions rates in the small sample and resolve phase changes with these longer, 1-minute scans, Ar was flowed through a 40° C. bubbler (compared to 93° C. normally) for oxidation, and a lower H$_2$ content (4% H$_2$—Ar Bal) for reduction. Given these modifications for Fe—Mo, the reaction kinetics derived from in-situ XRD cannot be compared to previous in-situ experiments, nor bulk samples; bulk sample measurements using identical conditions to previous experiments will thus be presented as well to compare reaction kinetics between systems.

Figure 3:
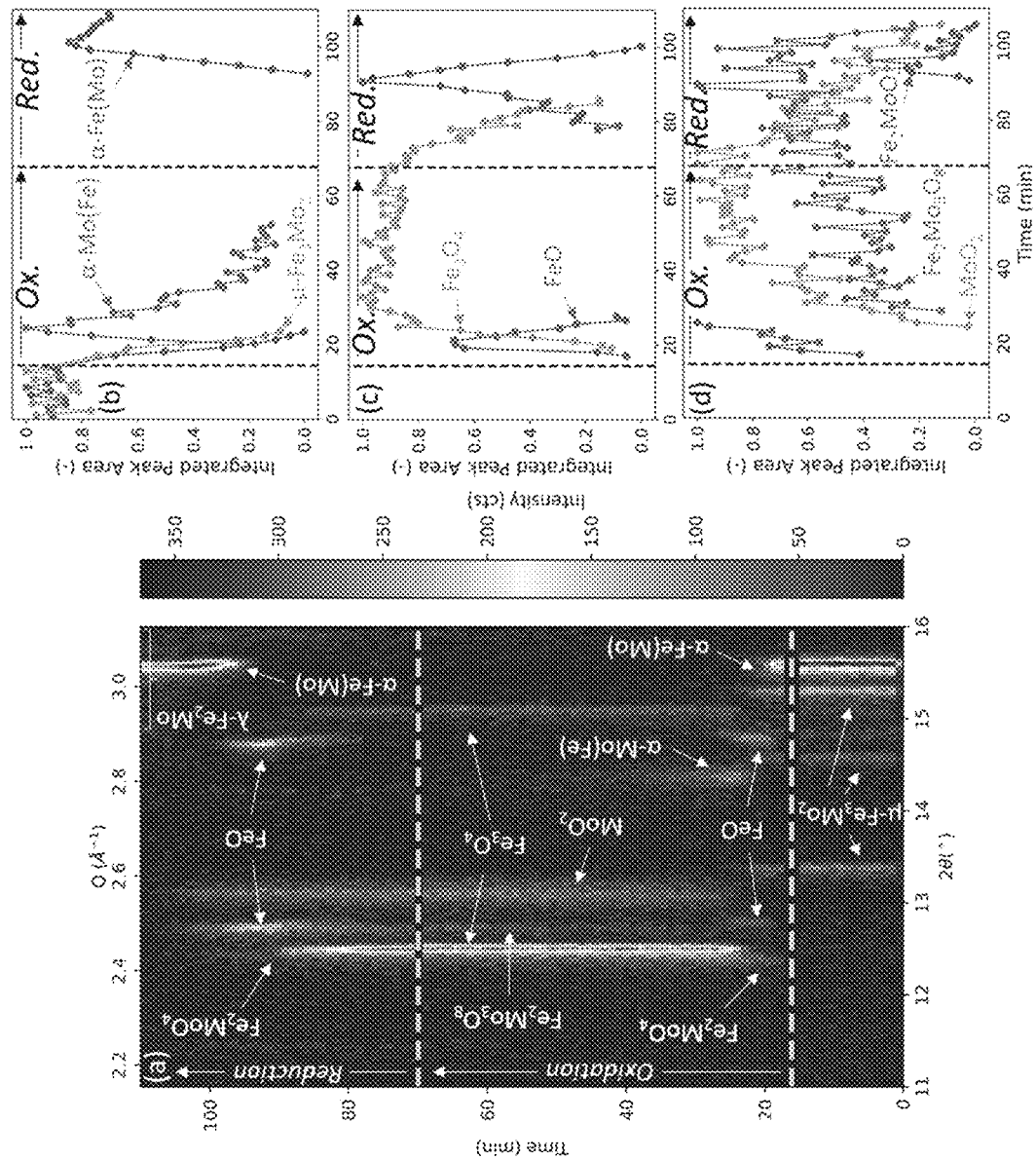
FIG. 3 shows in-situ XRD data of Fe-25Mo foam during the first redox cycle according to embodiments of the invention. Panel (a): Stacked background corrected XRD diffractograms with respect to time for the entire first cycle. Panels (a)-(d): Normalized peak integral of each phase, tracked through the most intense reflection, throughout the redox process, separated as panel (b) Metallic phases, including μ-$Fe_3Mo_2$<1 1 6>, α-Fe(Mo)<1 1 0>, and α-Mo (Fe)<1 1 0>. Panel (c): Iron oxides, including FeO<2 0 0>, and $Fe_3O_4$<1 3 1>. Panel (d): Molybdenum containing oxides, including $Fe_2MoO_4$<1 1 3>, $Fe_2Mo_3O_8$<1 1 2>, and $MoO_2$<1 1 0>.

The entire redox process under in-situ XRD is detailed in panel (a) of FIG. 3. Only a small 2θ range is shown, highlighting the most intense reflections of each phase, which are used to track the reaction in panels (b)-(d) of FIG. 3. The initial structure is the same as the ex-situ XRD pattern for the as-sintered samples above, featuring a mixture of $\alpha$-Fe(Mo), $\mu$-Fe$_3$Mo$_2$ and Fe$_3$Mo$_3$C. Fe$_3$Mo$_3$C is not tracked here due to peak overlap with $\mu$-Fe$_3$Mo$_2$. The sample is kept under 4% H$_2$—Ar at 800° C. for the first 15 minutes to ensure furnace equilibration; however, no 1-Fe$_2$Mo is formed in the time allowed, indicating a sluggish transformation from $\mu$-Fe$_3$Mo$_2$ (stable at the sintering temperature of 1000° C.) to 1-Fe$_2$Mo (stable at the redox temperature of 800° C.). At the onset of oxidation (t=15 min), $\alpha$-Fe(Mo) and $\mu$-Fe$_3$Mo$_2$ are rapidly oxidized, as noted by the decreasing peak integral in panel (b) of FIG. 3 (Blue and Orange). The full oxidation of these initial metallic peaks occurs in the first 9 minutes of oxidation; however, as these phases are oxidized, Mo is not fully oxidized, leaving behind na $\alpha$-Mo(Fe) peak, which grows as the other metallic peaks shrink (panel (b) of FIG. 3, green). The first oxide phase that forms is the mixed oxide Fe$_2$MoO$_4$ (FIG. 3*d*, blue), which is the only oxide phase in equilibrium with both $\alpha$-Fe(Mo) and $\mu$-Fe$_3$Mo$_2$, and lowest oxidation state for a mixed oxide on the Fe—Mo—O ternary phase diagram. Following this, FeO is formed at t=17 min, as shown in FIG. 3*c*, green. FeO reaches a maximum at t=19 min, at which time Fe$_3$O$_4$ begins forming (panel (c) of FIG. 3, orange). The FeO lattice parameter shift, while not reported here, is consistent with our previous in-situ studies. FeO is completely oxidized to Fe$_3$O$_4$ by t=26 min, taking a total of 11 minutes since the beginning of the oxidation period. The preferential oxidation of Fe is likely kinetically driven, as MoO$_2$ is more stable than Fe$_3$O$_4$ at this temperature. At t=25 min, the remaining Mo metal begins to further oxidize towards MoO$_2$, indicating that the alloying element is redox active in this system. At roughly the same time, Fe$_2$Mo$_3$O$_8$ begins to form. The decrease of the initial mixed oxide, Fe$_2$MoO$_4$, corresponding to its further oxidation, is not tracked here, due to overlap with the Fe$_3$O$_4$ peak under Ag radiation. The Mo metal is fully oxidized by t=53 min, representing the rate limiting step of oxidation.

Figure 4:
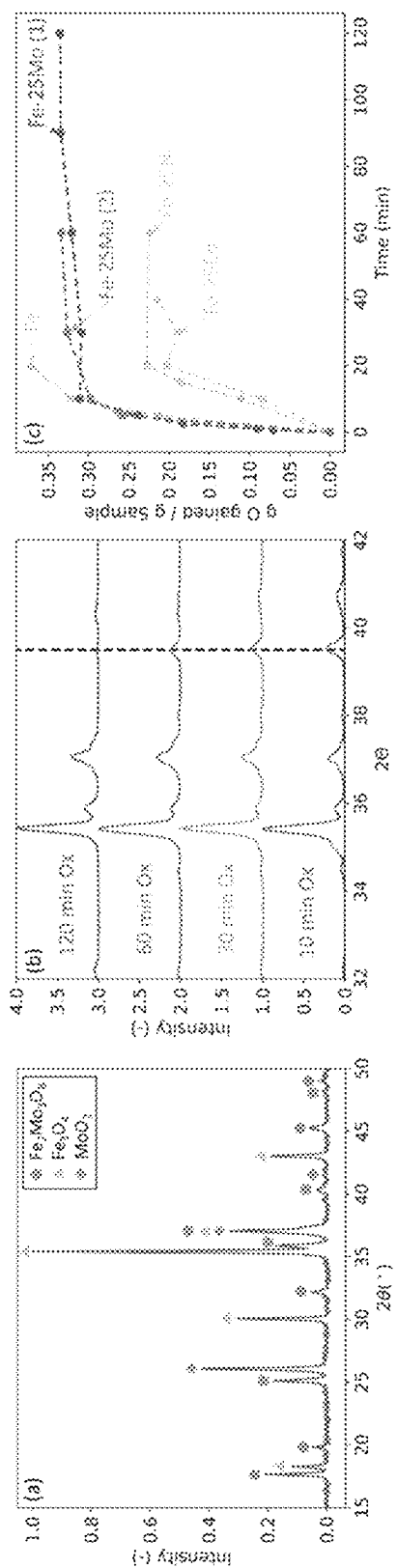
FIG. 4 shows oxidation process of Fe-25Mo alloys, detailing kinetics, and phase equilibrium for bulk sample according to embodiments of the invention. Panel (a): Ex-situ XRD pattern for fully oxidized sample. Panel (b): Ex-Situ XRD patterns for samples interrupted at different points during oxidation. Purple line indicates peak of $Fe_3Mo_3C$. Panel (c): Mass gains for bulk samples interrupted during oxidation, Fe-25Mo(1) and Fe-25Mo(2) curves refer to first and second oxidation half-cycles, respectively.

Oxidized Composition and Bulk Oxidation Kinetics: At full oxidation, the foam contains Fe$_3$O$_4$ (51.6 mol %, 60.7 vol %), MoO$_2$ (40.4 mol %, 21 vol %), and Fe$_2$Mo$_3$O$_8$ (8 mol %, 18.4 vol %) (FIG. 4*a*). Trace amounts of volatile MoO$_3$ are formed, as evidenced by condensation downstream of the sample; however, the amount formed is negligible, evidenced by no measurable mass loss over 50 cycles of oxidation (<1 mg). The small amount of MoO$_3$ formed under these oxidation conditions is consistent with previous literature, despite its presence on the phase diagram. Further, Fe$_2$O$_3$ is not seen, consistent with previous Fe foams and the inability to form Fe$_2$O$_3$ under steam, and other mixed oxides present on the ternary phase diagram are not seen. The fate of the carbon, initially trapped in the iron-molybdenum carbide, can be seen in FIG. 4*b*. As oxidation begins, the carbon shifts to the binary compound, Mo$_2$C. Utilizing a longer first oxidation half-cycle, this compound is fully oxidized after 2 h, eliminating the carbon content (via CO), as there is little to no solubility of carbon in the oxide phases present. This is confirmed via chemical analysis, as carbon content after the first oxidation in Fe—Mo foams is comparable to previously reported very low values in Fe and Fe—Ni foams.

The oxidation of molybdenum also serves to increase the storage capacity of the Fe-foam, which can be measured as grams of oxygen gained per gram of sample. For a pure Fe foam, oxidizing fully to Fe$_3$O$_4$, the expected mass gain is 0.38 gram oxygen per gram of sample. For Fe-25Mo, given the fully oxidized composition above, the expected mass gain is 0.36 g O/g sample, representing 95% of the storage capacity of a pure Fe-foam. This is also a significant improvement over previous alloys tested where the alloying element is inert, such as Fe-25Ni or Fe-25Co, which both have a capacity of 0.28 g O/g sample. Utilizing the same oxidation conditions, the rates of oxidation can be compared, as seen in FIG. 4*c*, which also reflects the difference in effective capacities. The first oxidation of a Fe-25Mo foam, shown in red, is equal or slightly faster than a pure Fe-foam, seen in orange, and significantly faster than either previous alloy tested, including Fe—Ni and Fe—Co. The ability of Mo to catalyze the oxidation of Fe has previously been explored; however, the similar oxidation rate between Fe and Fe-25Mo seen here is likely a combination of the catalytic properties of Mo, the rate limiting Mo-oxidation step, and microstructural (porosity) effects, the latter of which is explored later. The second cycle of Fe-25Mo oxidation, shown in purple, is faster than the first cycle. The improved oxidation rate for Fe-25Mo foams can be explained by a combination of the lack of C in the second cycle and microstructural effects.

Figure 5:
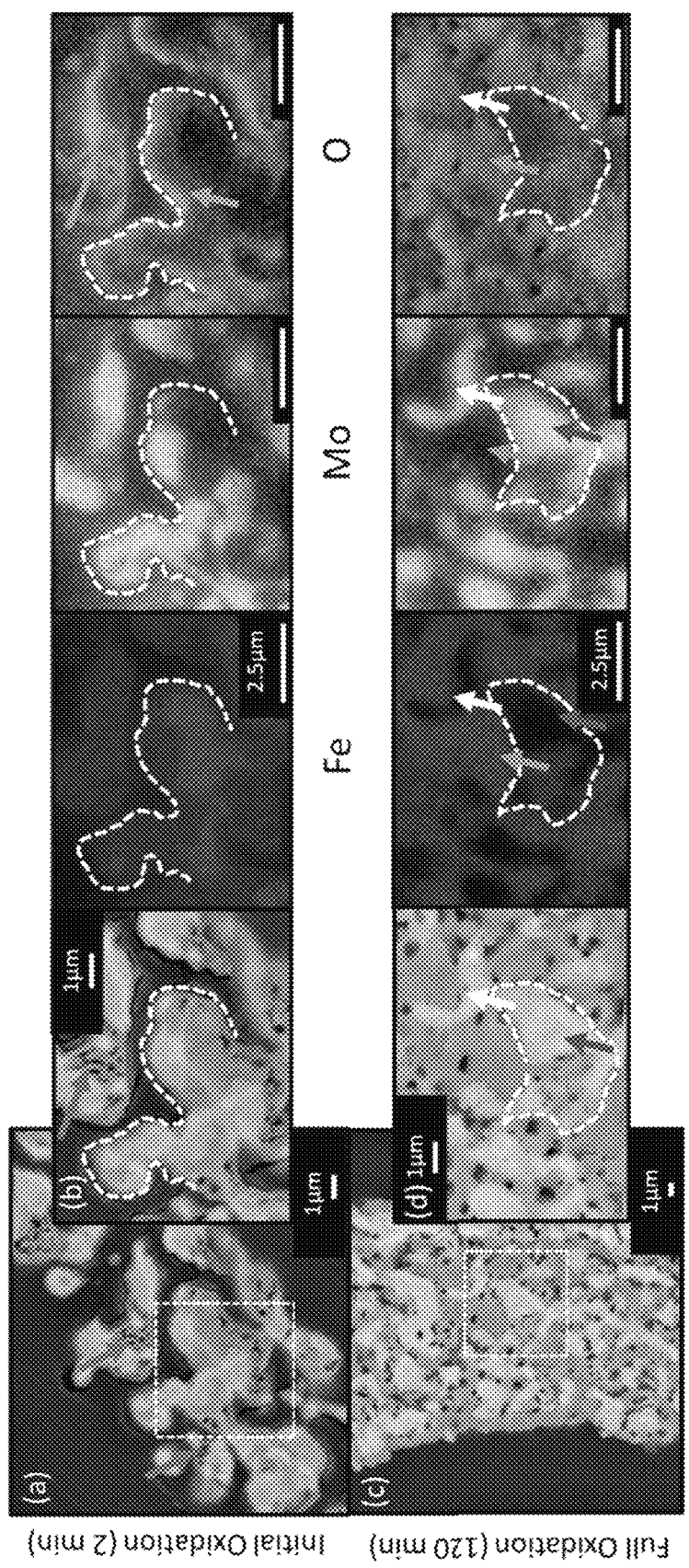
FIG. 5 shows microstructural evolution of Fe-25Mo lamellae during first oxidation. Panel (a): SEM BSE image of ion-milled lamellae 2 minutes into oxidation. Panel (b): Magnified region, with corresponding EDS maps for Fe, Mo, and O. Panel (c): SEM BSE image of ion-milled lamellae after full oxidation. Panel (d): Magnified region, with corresponding EDS maps. White dashed lines outline grains to help show compositional differences. Blue arrows highlight gas-egress channels left behind from reduction and sintering, orange arrows oxide scale, green arrows Fe-rich regions, grey arrows Mo-rich regions, and blue arrows mixed-oxide regions.
Figure 6:
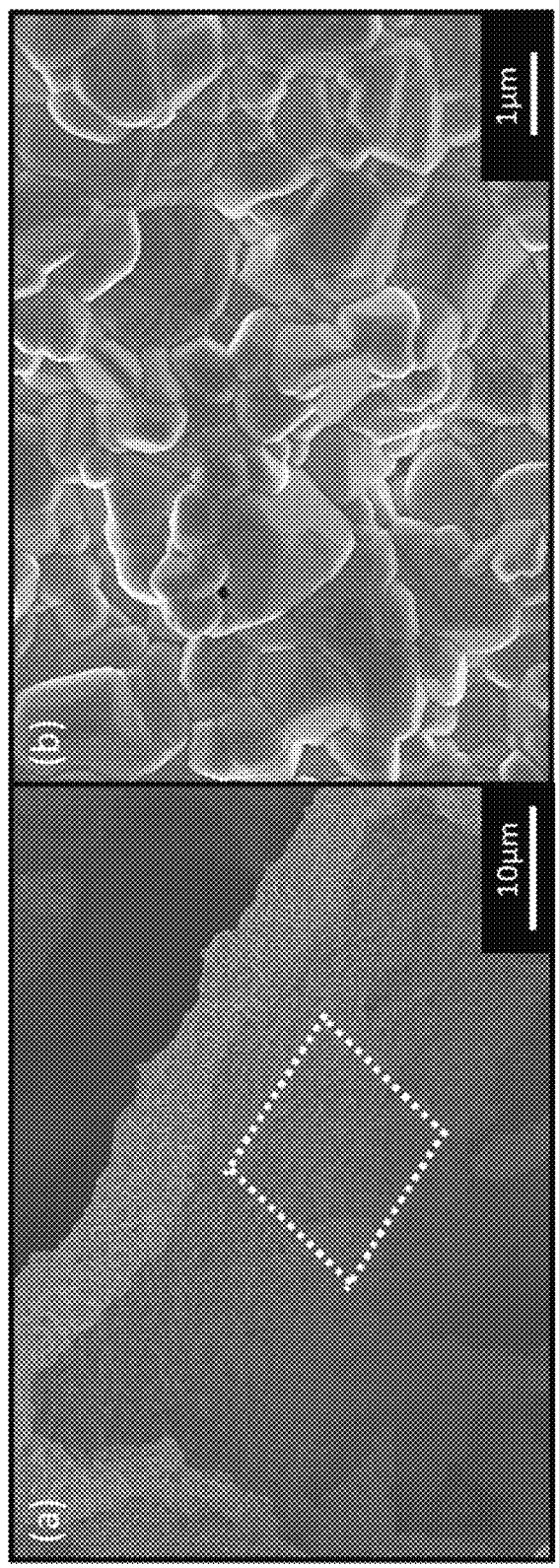
FIG. 6 shows SEM imaging of Fe-25Mo lamellar surface at full oxidation according to embodiments of the invention. Panel (a): Low-magnification image of lamellar wall. Panel (b): Side view, highlighting faceting of oxide and near absence of surface pores.

Microstructural Oxidation Evolution: A lamella cross section at the onset of oxidation (2 minutes) is shown in panel (a) of FIG. 5. The cross section was ion-milled to ensure the oxide shell was not damaged during polishing. Ion-milling also reveals internal porosity present within grains (panels (a)-(b) of FIG. 5 blue arrows), showing a submicron gas-egress network present from the initial reduction of the oxide precursor powders under $H_2$, forming $H_2O$. The presence of such a network has been detailed previously. Oxidation initiates on the exterior of each grain on the internal surface of steam-egress channels, highlighted by orange arrows in the oxygen map in panel (b) of FIG. 5. The increased surface area, as compared to pure-Fe lamellae that are fully sintered, partially explains the constant or slightly increased oxidation rate seen in these foams. Previously explored effects of Mo catalyzing the oxidation of Fe likely contribute as well. At this stage in oxidation, distinct Fe and Mo rich regions still exist within the non-oxidized interior of the grains. As oxidation proceeds, the volumetric expansion of the Fe and Mo oxides fill in voids between the grains in the partially sintered lamellae. At full oxidation, small pores are left, but most of the lamellae have densified, as seen in panel (c) of FIG. 5. This is further seen panel (a) of FIG. 6, where the entire lamellar wall is dense. The exterior surface of the wall, shown in panel (b) of FIG. 6 is faceted, with few open surface pores. Kirkendall porosity, which plagued Fe-only foams, is significantly limited here, due to two primary features. First, the interlamellar porosity present lowers the diffusion distance of Fe moving out and O moving in during oxidation, thus, less Kirkendall pores are formed. The gas-egress channels, likely larger here due to sintering inhibition, combined with pores present throughout the lamellae, also act as sinks for such pores, preventing the buildup within the first cycle.

Lamellar cross sections show two distinct regions: Fe-rich (Green arrows) and Mo-rich (Grey arrows), in panel (d) of FIG. 5 EDS maps. The mixed oxide, $Fe_2Mo_3O_8$ has a similar average Z to $MoO_2$, thus it appears with the same contrast as $MoO_2$ in panel (d) of FIG. 5. In EDS maps, however, regions immediately surrounding Mo-rich areas, highlighted in white, show a slight decrease in Mo intensity and an increase in Fe intensity. This is consistent with mixed oxide regions, lying in-between the other two oxides present. Also, the oxide map appears darker in Mo-rich regions (panel (d) of FIG. 5, 0 map). This is not representative of less oxidized Mo regions, instead it is due to the attenuation of signal from the Mo. The three oxides present at full oxidation have no solubility in each other, explaining the distinctly separated regions.

Reduction of Fe-25Mo Lamellar Foams

In-Situ XRD: Reduction begins at t=70 min: $Fe_3O_4$ begins reducing immediately, as expected due to the lower stability as compared to the molybdenum-oxides. $Fe_3O_4$ reduction follows the reverse evolution as oxidation; first reducing to FeO, and finally back to Fe, which begins forming at t=93 min. The full reduction of $Fe_3O_4$ occurs in 15 minutes, and at t=100 min, all FeO has been reduced. The reduction of the $MoO_2$ begins shortly after the iron oxide, at t=73 min, and is reduced towards the α-Fe(Mo) phase, fully reducing by t=106 min. As the $MoO_2$ reduces, the presence of mixed oxide slightly increases. Finally, the mixed oxide reduces, starting at t=90 min. A small amount of the lower-oxidized form of the mixed oxide reforms, and then is rapidly reduced as well. The entire reduction process is done by t=107 min.

Figure 7:
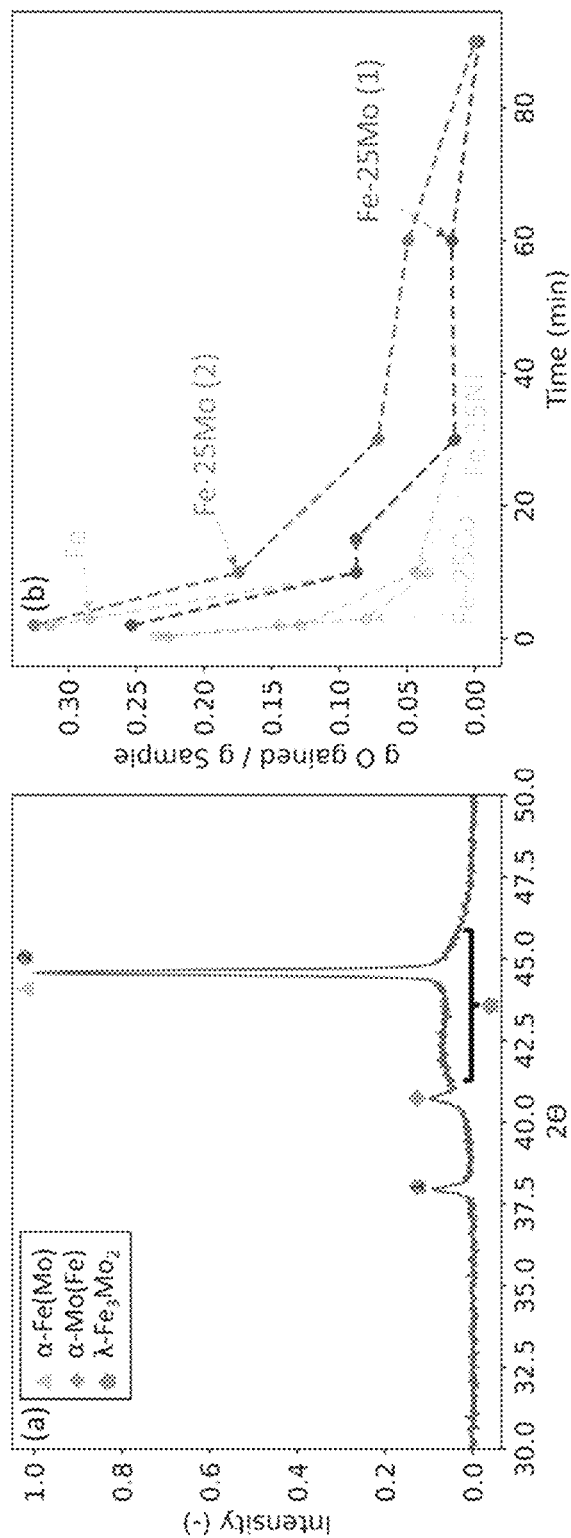
FIG. 7 shows reduction process of Fe-25Mo alloys, detailing kinetics, and phase equilibrium for bulk samples according to embodiments of the invention. Panel (a): Ex-situ XRD pattern for fully reduced sample. Panel (b): Mass measurements for bulk samples interrupted during reduction. Amorphous region is found to be nanocrystalline λ-$Fe_2Mo$, green peaks 1 and 2 represent the (1 1 0) and (1 1 2) reflections for λ-$Fe_2Mo$, respectively. Fe-25Mo(1) and Fe-25Mo(2) curves refer to first and second oxidation half-cycles, respectively.

The initial metallic phase is almost pure Fe, as it forms from the newly reduced binary FeO. As the $MoO_2$ begins to reduce, the lattice parameter of the α-Fe(Mo) peak shifts, indicating an increase in Mo content. Following this, there is a slight decrease in the α-Fe(Mo). Ex-Situ XRD, shown in panel (a) of FIG. 7, shows three additional phases not visible under in-situ diffraction due to short scan time; an α-Mo(Fe), μ-$Fe_3Mo_2$, as seen in the as-sintered samples, and a nanocrystalline $Fe_2Mo$ phase. This λ-$Fe_2Mo$ phase is consistent with the equilibrium at 800° C. on the phase diagram, and further, its presence as a nanocrystalline compound has been previously reported after hydrogen reduction of iron-molybdenum oxides.

Bulk Reduction Kinetics and Microstructural Evolution: Interrupted cycling of bulk Fe-25Mo foams during reduction (panel (b) of FIG. 7) reveals slower reduction kinetic than seen in previous alloy systems studied such as Fe—Co (Green line) and Fe—Ni (Blue line), revealing that Mo does not have the same catalytic effect on reduction as the other allying elements. However, the reduction of Fe—Mo foams is similar to Fe-only foams (Orange line) in the initial reduction, where the mass loss in Fe—Mo is dominated by the reduction of Fe; however Fe—Mo reduction then slows, indicating that the reduction of the Molybdenum oxide and mixed oxides is the rate limiting step in the reduction of the foam.

Figure 8:
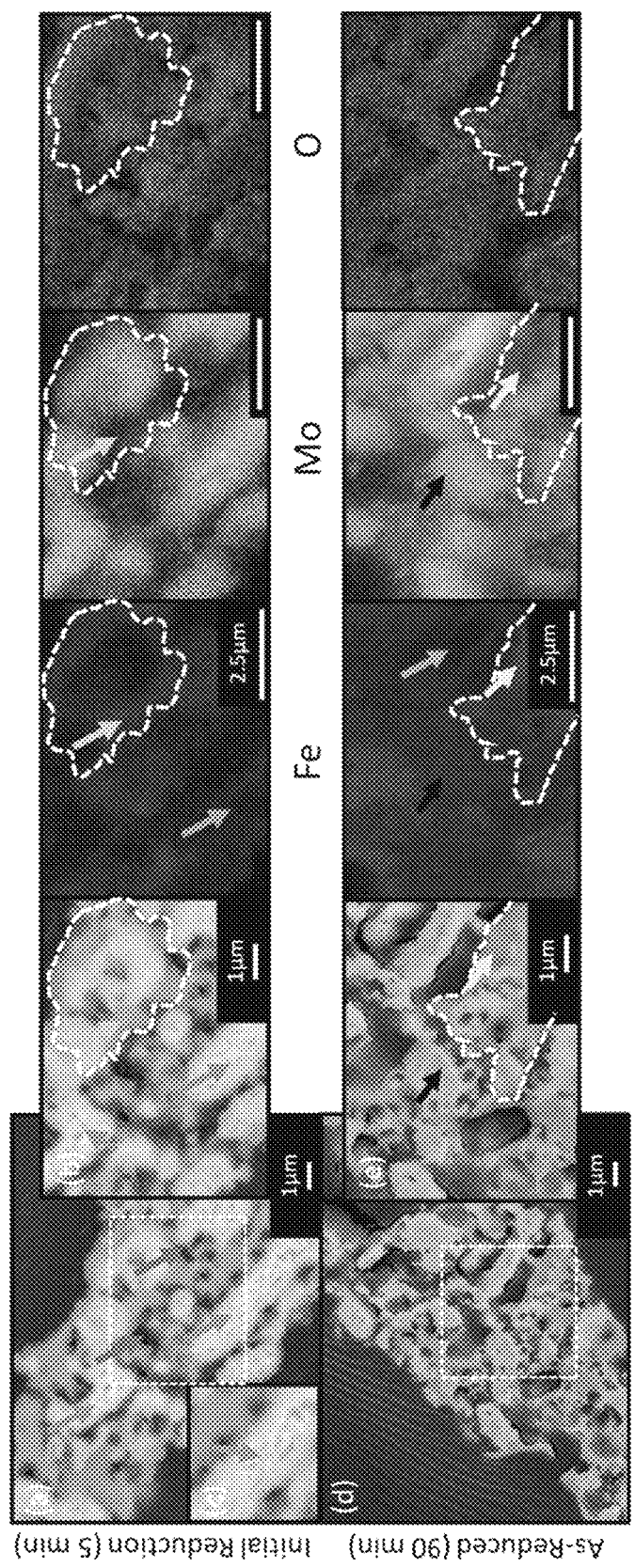
FIG. 8 shows microstructural evolution of Fe-25Mo lamellae during first reduction according to embodiments of the invention. Panel (a): SEM BSE image of ion-milled lamellae 5 minutes into reduction. Panel (b): Magnified region, with corresponding EDS maps for Fe, Mo, and O.

Reduction initiates primarily at the interface between the iron-rich and molybdenum-rich regions (panel (a) of FIG. 8, blue arrows), where iron is reduced and leaves behind pores due to it's the volumetric shrinkage. Within the Mo rich regions seen at the onset of reduction, a speckled pattern can be seen in the interior (panels (a)-(b) of FIG. 8 green arrows). Since the $MoO_2$ reduces preferentially over the $Fe_2Mo_3O_8$, one possible explanation is that the $MoO_2$ is reducing, creating small pores as it volumetrically contracts. As the reduction of $MoO_2$ produces steam as a byproduct, it must escape through the mixed oxide region, thus preventing the mixed oxide from reducing, as seen in panel (d) of FIG. 3. Reduction proceeds (panel (c) of FIG. 8), with an expanding porosity within the foam. Regions of α-Mo(Fe) (panel (d) of FIG. 8, orange arrows), α-Fe(Mo) (panel (d) of FIG. 8, white arrows) exist as isolated segments of the microstructure, with the nanocrystalline $Fe_2Mo$ phase spread throughout the interior. The microstructure, while not identical to the as-sintered structure, shows an increase in free surfaces present, explaining the increase in oxidation rate upon the $2^{nd}$ oxidation cycle, seen in panel (c) of FIG. 4.

Lamellae walls after the first cycle still show porosity open to the surface (panel (a) of FIG. 9). However, the needle-like regions seen in the as-sintered lamellar walls no longer exist, replaced by large smooth surfaces (panel (b) of FIG. 9). Open surface porosity, highlighted in panels (b)-(c) of FIG. 9, reveal a highly porous interior, with a morphology common among hydrogen-reduced iron-molybdenum oxides, specifically nanocrystalline λ-$Fe_2Mo$. The high surface area interior is another reason that the oxidation rate may increase upon the second cycle, seen in panel (c) of FIG. 4.

Multiple Cycle Evolution

To study the long-term degradation of Fe-25Mo foams, samples were subject to multiple consecutive redox cycles at 800° C. The first oxidation cycle was chosen to be 120 minutes to ensure all carbon is eliminated and does not affect the performance of the foam. After this, foams were subject to 90-minute oxidation followed by 90-minute reduction half cycles, to ensure full oxidation and reduction. Given the high operating temperature and full extent of reaction, this study can be considered an accelerated degradation study, with the primary goal of exposing mechanisms of mechanical densification.

Two foam architectures were tested, based on variation in freeze cast wavelength; one set of foams featured a wavelength of 50 µm (Wall Width=13 µm, Channel Width=37 µm) and the other set 30 µm (Wall Width=8 µm, Channel Width=22 µm). Wavelength was varied by modifying the pH of the slurry; by adding $HNO_3$, the pH was lowered, moving closer to the point of zero charge of $MoO_3$. This in turn increased the effective particle size, creating a larger freeze cast wavelength, consistent with previous freeze casting literature. Examples of both freeze cast architectures are shown in FIG. 10.

Microstructural Evolution: The microstructural evolution of lamellae during the first 10 redox cycles is shown in FIG. 11. Since the microstructural evolution is nearly identical for these initial cycles in both freeze cast wavelengths, only cross sections of $\lambda=50$ µm foams are shown here. After the first redox cycle (panel (a) of FIG. 11), significant microporosity exists within the lamellae. Regions rich in Fe exist, particularly near the surface of the lamellae, highlighted by green arrows. These $\alpha$-Fe(Mo) regions begin to form a shell-like surface, although discontinuous, with open surface porosity as seen earlier. As cycling continues, the exterior of the lamellae becomes richer in Fe, primarily due to the preferential oxidation of Fe as explored earlier (panel (b) of FIG. 11). However, the microporosity is retained in the interior of the foam, aided by the sintering inhibition provided from Mo, and open porosity still exists on the surface. This represents a distinctly different shell performance than previously explored, where the shell does not act as a diffusion barrier to the oxidation of the interior region. In this case, it is further likely that, since the Fe shell region is <1 µm wide, upon oxidation, the volumetric expansion causes cracking, leading to additional gas access to the interior of the foam. As cycling is continued, the presence of microporosity is retained, despite certain regions that appear to have a complete shell (panel (c) of FIG. 11). Further, the entire foam is still oxidized in 90 minutes, as confirmed via mass gain, confirming that there is sufficient gas access to the entire lamellae. The Mo and Fe content in the middle of the lamellae also become more evenly distributed, signifying smaller domains of the $\alpha$-Fe(Mo) and nanocrystalline $\lambda$-$Fe_2Mo$.

The microstructure appears stable through both 20 cycles (panel (d) of FIG. 11) and 50 cycles (panel (e) of FIG. 11), displaying a mostly porous lamellae, with roughly the same width, without significant fracture. Past 20 cycles, Mo-dense regions (panel (d) of FIG. 11, orange arrow) form, along with larger, circular pores (panel (d) of FIG. 11, white arrows). Additionally, after 50 cycles, the larger wavelength foam begins to form "bulbs" at different parts of the lamellae, seen in panel (a) of FIG. 12. The bulb regions has similar microstructure (panel (b) of FIG. 12) as compared to other regions, seen in panel (e) of FIG. 11. EDS reveals no significant chemical gradients present (panels (c)-(d) of FIG. 12 in the bulb regions. These regions are likely a product of free surface and curvature minimization at large cycle times. Secondary dendrite arms, along with buckling from the reduction and sintering process are common in such foams, and over long periods at elevated temperatures, the curvature of these features is minimized by creating spherical regions. This is significantly more prevalent in the larger wavelength samples, due to the longer lamellae featuring more buckling, and thus more regions where bulb formation will occur.

Along with the fully reduced structure, the oxidized structure also evolves with continual cycling. A fully oxidized cross section after 30 cycles is shown in panel (a) of FIG. 13. In stark contrast to the cross section detailed after the first cycle, (when regions with slightly higher Mo content exist (panel (a) of FIG. 13, green arrows)), distinct regions of Fe-rich oxide and Mo-rich oxide no longer exist; instead they are spread into significantly smaller domains. Pores are larger than seen previously, however still present in the fully oxidized structure (panel (a) of FIG. 13, blue arrows). The mass gain after 30 cycles is ~91% of the initial mass gain, measured after 1 cycle. This loss in effective capacity is due to entrapped molybdenum metal regions, shown in orange (panel (a) of FIG. 13). These are surrounded directly by other oxide compounds, effectively creating a diffusion barrier to the oxidation of the interior material. In contrast to battery materials, where side reactions make the capacity unrecoverable, these regions are not lost to oxidation potential, rather, they represents "kinetic" capacity limitations, which are exposed due to the constant cycle lengths used here.

In the 50-cycle oxidized cross section, shown in panel (b) of FIG. 13, the structure looks similar, with small unoxidized Mo regions (Orange arrows), Mo-rich regions (Green) and large pores (Blue). However, the effective capacity is measured at 85%, which is 5% less than after 30 cycles. This further decrease in active material is again assigned to Mo, where larger Mo regions can be found in the bulb type regions, as shown in panel (c) of FIG. 13. Here, larger Mo grains are entrapped, due to the larger diffusion distances as compared to normal lamellae widths.

Macrostructural Evolution: The evolution of the lamellae macrostructure can be seen in FIG. 14 over the first 10 cycles. In panel (a) of FIG. 14, a light ring is visible surrounding the exterior of the foam; this is present in some of the larger wavelength foams and represents misaligned colonies near the edge of the sample, stemming from suspension instability. These regions are excluded in wall and pore widths calculated below. Over the initial 10 cycles, the lamellar structure in large wavelength samples is mostly preserved; lamellae remain straight, and aligned, as seen in FIG. 14. After 10 cycles, some lamellar buckling is visible, highlighted in areas near colony boundaries, promoting the pinning of ends of lamellae, and thus their buckling while the lamellae are partly metallic during oxidation and reduction. Importantly, there is no exterior shell visible, or fracture of lamellae centered at the edges of the foam. The structural evolution over these initial cycles for the smaller wavelength samples, shown in panels (d)-(f) of FIG. 14 tells a similar story, however, little to no buckling is visible, even at the boundaries between neighboring colonies. This highlights the decreased buckling with lower aspect ratio lamellae, consistent with previous work.

The structural rigidity of Fe-25Mo foams over the first 10 redox cycles is reflected in FIG. 17. The initial porosity, shown in panel (a) of FIG. 17, is higher than other systems previously tested, showing the impact of the sintering-inhibition of Mo. More importantly, the porosity stays near constant through the first 10 cycles, in contrast to the rapidly decreasing porosity in Fe and even other alloy systems in comparison. This shows the vast improvement shown by Fe-25Mo foams in terms of retaining porosity necessary for gas flow in and out of the foam. The mean lamellar thickness, shown in panel (b) of FIG. 17 further shows near constant average values over the first 10 cycles, signifying that lamella are not sintering together. Finally, the near constant pore width over the first 10 cycles, as shown in panel (ca) of FIG. 17, reflects a significantly reduced lamellar buckling as compared to the other alloy systems previously explored. The data collected for Fe-foams and other alloy systems end at 10 cycles, due to densification and/or early shell formation. However, these Fe—Mo foams without shells can continue to cycle.

In the larger wavelength samples, after 20 redox cycles, buckling begins to dominate. While a shell is still not visible (panel (a) of FIG. 15), significant internal lamellar buckling is present, seen in panel (b) of FIG. 15. The buckling here, however, does not lead to sintering of neighboring lamellae, as additional spacing between lamellae allows for some buckling to occur before contacting neighboring lamellae. After 50 cycles, internal buckling has significantly increased, where areas of densely packed lamellae are more commonly seen (panel (d) of FIG. 15). This is due in part to the prevalence of bulbs discussed earlier, which effectively bring neighboring lamellae closer to contacting, and thus accelerate sintering. Despite this, however, a densified outer shell is still not visible. Even when neighboring lamellae contact, as seen in panel (c) of FIG. 15, this does not trigger a chain reaction, as seen in previous system; whereas here, two lamellae combine, leaving open porosity on either side of them. This prevents the shell from dominating the performance of the foam at large. The slight densification, sintering of neighboring lamellae, and buckling increasing mean pore width, are reflected in panels (a)-(c) of FIG. 17. Despite this, the porosity and mean lamellar width is still far below that seen in other alloy systems and pure Fe foams.

While the larger wavelength foam begins to degrade at larger cycle times, the smaller wavelength foam shows less macrostructural changes. The cross section after 30 cycles, shown in panel (a) of FIG. 16, display no significant buckling or exterior densification. The magnified cross section reflects this (panel (b) of FIG. 16), where shorter lamellae feature less buckling, and thus less precursors to densification. The 50 cycle sample (panels (c)-(d) of FIG. 16) looks almost identical, with the addition of buckling of these shorter lamellae. However, the curvature created via buckling is much less than that of the larger lamellae and means that these shorter lamellae still are far from contacting and eventually sintering with each other. As previously explained, this is aided by less bulb formation in smaller wavelength foams. The increased structural rigidity of these foams is highlighted in panel (a)-(c) of FIG. 17 where there is little to no distinguishable change in average lamellae thickness or channel width, and only a slight decrease in channel porosity after 50 consecutive redox cycles.

CONCLUSION

Freeze-cast Fe-25Mo (at %) lamellar foams, when subjected to steam-hydrogen redox cycling at 800° C., are much more damage- and sintering-resistant than previously studied Fe, Fe-25Ni and Fe-25Co foams. Molybdenum alloying provide high macro- and microstructural stability as well as high reaction reversibility: after 50 redox cycles at 800° C., foams maintain a 65% porosity (i.e., ~80% of their initial porosity).

The high structural damage resistance of Fe-25Mo foams stems from Mo acting as a sintering inhibitor, creating a hierarchically porous foam with:
  wide channels between neighboring lamellae, which provide gas access to lamellae, into and out of the foams and accommodate lamellar expansion and contraction without interlamellar contact and sintering, thus preventing macroscopic foam densification; and
  microporosity within lamellae, which provides additional gas access and free volume to accommodate the volumetric expansion of lamellae during oxidation, thus limiting the radial expansion of lamellae, lowers the diffusion distances during oxidation, thus accelerating kinetics and limiting formation of Kirkendall pores, and provides additional Kirkendall pore sinks, preventing large-scale cracking of lamellae.

The high reaction reversibility stems from the above reversibility of the porous structure, and is influenced by the ability for Mo to undergo redox transformation together with Fe (unlike Ni and Co), with the main results being:
  a multi-phase oxide foam is created, consisting of $Fe_3O_4$, $MoO_2$, and $Fe_2Mo_3O_8$, when fully oxidized; the interpenetrating structure of these high-strength phases limits lamellar buckling and $Fe_3O_4$ coarsening diffusion-based sintering;
  the oxidation kinetics for Fe are maintained due in part to the kinetic benefit of Moto catalytic activity of the Mo, but the reduction kinetics are slowed, particularly for the mixed oxide $Fe_2Mo_3O_8$; and
  reduction of the mixed-oxide structure produces nanocrystalline $\lambda$-$Fe_2Mo$ whose fine feature size further hastens subsequent oxidation.

Overview and Future Steps

Overall, this work has presented the success of alloying in mitigating and reducing degradation mechanisms in Freeze-cast Fe foams for redox cycling applications. Two primary strategies have been presented; (1) Alloying with redox-inert elements to provide a metallic backbone for lamellae, provide adhesion to prevent fracture, and prevent Kirkendall formation, and (2) Alloying with redox-active sintering inhibitors, working to prevent the buckling and sintering driven degradation seen in the redox-inert alloys. The work has revealed that many properties of alloying elements, including redox kinetics, equilibrium phases, diffusivities, and mechanical strength play an important role in stabilizing Fe-foams, not present in other architectures.

With the increased understanding of how alloy properties affect the structural and chemical evolution of these foams, new elements can be explored, namely Tungsten, along with ternary compositions (e.g., Fe—Mo—Ni), to further improve the performance of these foams, and uncover new catalyzing effects or stabilization mechanisms. With the ability to stabilize these foams for a multitude of cycles, these foams can also be tested in a full solid-oxide iron-air battery setup to begin to compare the performance of these foams with other commonly used iron-air materials. Further, understanding the degradation in these foams at lower temperatures that Fe-air batteries are commonly being tested at in literature could provide a more accurate comparison now that the degradation mechanisms in these foams have been explored.

Example 2

Iron-Nickel System and Others

FIG. 18 shows representative cross section of Fe-25Ni lamellar foam portion (white) used in in-situ XRD, after 1 redox cycle according to embodiments of the invention. Red arrows point to wall of quartz capillary in which sample was enclosed. Gas flow direction indicated. The cross section shows that the lamellar structure is preserved for the in situ samples.

FIG. 19 shows representative cross section of lamellar Fe foam after 1 redox cycle in the in-situ XRD setup according to embodiments of the invention. Red arrows point to trapped oxide present after reduction. Gas flow direction indicated. The trapped oxide indicates that the degradation mechanisms present for the bulk foams are also present for the in situ samples, showing that the in situ testing is representative of bulk behavior.

FIG. 20 shows Fe—Ni—O Ternary phase diagram (800° C. Isotherm) computed using Thermocalc according to embodiments of the invention. Axes are scaled in terms of mole fraction of component. The orange line highlights overall reaction pathway with constant Fe/Ni ratio and increasing O content. Magnified version highlighting FeO region (from ~51.3 to 52.7 at % O) and tielines to the fcc-Fe(Ni) region.

FIG. 21 shows cross-section micrographs (optical, SEM and EDS) of Fe-25Ni foam after reduction and sintering according to embodiments of the invention. These demonstrate homogenous distribution of Fe and Ni throughout the lamellae. Red arrows highlight examples of secondary dendrite arms.

FIG. 22 shows SEM views of an Fe-25Ni lamella, in an as-fabricated foam after reduction and sintering according to embodiments of the invention. Panel (a): low-magnification view showing pores for steam egress/hydrogen ingress (black, three of which are highlighted with red arrows). Panel (b): high-magnification view (between pores) showing fine grain size, with red dashed lines outlining three grains visible on the surface.

FIG. 23 shows cross section of an Fe-25Ni lamella imaged at the beginning of reduction while the oxide and metallic phases are both present, according to embodiments of the invention. White arrows highlight newly reduced microchannels which are partially filled with oxide, thus opening microchannel porosity which remains present after reduction.

FIG. 24 shows degree of oxidation as measured by mass change for bulk Fe and Fe-25Ni foams according to embodiments of the invention. Fe-25Ni oxidizes more slowly than Fe, but also reduces much faster due to the reduction acceleration at the metal-oxide interface.

FIG. 25 shows micrograph of Fe-25Ni foam after 5 consecutive redox cycles according to embodiments of the invention. Blue arrows highlight extreme cases of buckling. All buckled lamellae have partially sintered with neighbors, often forming large, nearly-dense regions (as seen in the center of this micrograph). The kinetics of oxidation and reduction will be slower in this dense region due to poor gas access.

FIG. 26 shows micrograph of Fe foam after 10 consecutive redox cycles according to embodiments of the invention. Blue arrows highlight examples of sub-millimeter chambers created after lamellar buckling and corresponding sintering. The foam outer surface is sintered into a dense shell. This shell slows subsequent oxidation and reduction in the foam interior by limiting gas access.

FIG. 27 shows binary phase diagram for Fe—Co metallic foam compositions in single-phase field for Fe-25Co according to embodiments of the invention.

FIG. 28 shows ternary phase diagram for Fe—Co—O, calculated with Thermocalc at 800° C. according to embodiments of the invention. Black arrow indicates overall path of reaction (with constant Fe/Co ratio of 75/25 corresponding to Fe-25Co). The black dashed line indicates the tie line for the final composition, between Co-1Fe and $Fe_3O_4$.

FIG. 29 shows FeO lenses encapsulated within Fe—Co matrix after 1 cycle of operando XRD for Fe-25Co according to embodiments of the invention. FeO lenses are dark gray, with one shown with a red arrow, Fe—Co matrix is white. Microporosity (black) is visible within the lamellae Entrapped oxide results in incomplete reduction in the in situ sample, indicating the degradation mechanism for the in situ sample is representative of the degradation mechanism for the bulk foam.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications, and various publications, are cited and discussed in the description of this invention. The citation and/or discussion of such references is provided merely to clarify the description of the invention and is not an admission that any such reference is "prior art" to the invention described herein. All references cited and discussed in this specification are incorporated herein by reference in their entireties and to the same extent as if each reference was individually incorporated by reference.

LIST OF REFERENCES

[1]. Energy Information Administration, U. Monthly Energy Review—March 2022. (2022).

[2]. Wu, F.-B., Yang, B. & Ye, J.-L. Technologies of energy storage systems. in *Grid-scale Energy Storage Systems and Applications* 17-56 (Elsevier, 2019). doi:10.1016/b978-0-12-815292-8.00002-2.

[3]. Shriram Santhanagopalan, Kandler Smith, Jeremy Neubauer, Gi-Heon Kim, Ahmad Pesaran, M. K. *Design and Analysis of Large Lithium Ion Battery Systems.* (2015).

[4]. Mogensen, M. B. et al. Reversible solid-oxide cells for clean and sustainable energy. *Clean Energy* 3, 175-201 (2019).

[5]. Xu, N., Li, X., Zhao, X., Goodenough, J. B. & Huang, K. A novel solid oxide redox flow battery for grid energy storage. *Energy Environ. Sci.* 4, 4942-4946 (2011).

[6]. Wang, C. et al. Recent Progress of Metal-Air Batteries-A Mini Review. *Appl. Sci.* 9, 2787 (2019).

[7]. Drenckhahn, W. et al. A Novel High Temperature Metal-Air Battery. *Electrochem. Soc.* 50, 125-135 (2013).

[8]. Zhang, C. & Huang, K. A Comprehensive Review on the Development of Solid-State Metal-Air Batteries Operated on Oxide-Ion Chemistry. *Adv. Energy Mater.* 11, (2020).

[9]. Menzler, N. H. et al. Power-To-Storage—The Use of an Anode-Supported Solid Oxide Fuel Cell as a High-Temperature Battery. *ECS Trans.* 57, 255-267 (2013).

[10]. Berger, C. M. et al. Development of storage materials for high-temperature rechargeable oxide batteries. *J. Energy Storage* 1, 54-64 (2015).

[11]. Trocino, S., Lo Faro, M., Zignani, S. C., Antonucci, V. & Aricò, A. S. High performance solid-state iron-air rechargeable ceramic battery operating at intermediate temperatures (500-650° C.). *Appl. Energy* 233-234, 386-394 (2019).

[12]. Zhao, X., Li, X., Gong, Y. & Huang, K. Enhanced reversibility and durability of a solid oxide Fe-air redox battery by carbothermic reaction derived energy storage materials. *Chem. Commun.* 50, 623-625 (2013).

[13]. Thursfield, A., Murugan, A., Franca, R. & Metcalfe, I. S. Chemical looping and oxygen permeable ceramic membranes for hydrogen production—a review. *Energy Environ. Sci.* 5, 7421-7459 (2012).

[14]. Zhang, W. et al. Thermodynamic Analyses of Iron Oxides Redox Reactions. *8th Pacific Rim Int. Congr. Adv. Mater. Process.* 2013, *PRICM* 8 1, 777-789 (2013).

[15]. Leonide, A., Drenckhahn, W., Greiner, H. & Landes, H. Long Term Operation of Rechargeable High Temperature Solid Oxide Batteries. *J. Electrochem. Soc.* 161, A1297-A1301 (2014).

[16]. Saito, Y., Kosaka, F., Kikuchi, N., Hatano, H. & Otomo, J. Evaluation of Microstructural Changes and Performance Degradation in Iron-Based Oxygen Carriers during Redox Cycling for Chemical Looping Systems with Image Analysis. (2018). doi:10.1021/acs.iecr.7b04966

[17]. Bohn, C. D. et al. Stabilizing Iron Oxide Used in Cycles of Reduction and Oxidation for Hydrogen Production. doi:10.1021/ef100199f

[18]. Jakus, A. E., Taylor, S. L., Geisendorfer, N. R., Dunand, D. C. & Shah, R. N. Metallic Architectures from 3D-Printed Powder-Based Liquid Inks. *Adv. Funct. Mater.* 25, 6985-6995 (2015).

[19]. Zhao, X., Gong, Y., Li, X., Xu, N. & Huang, K. Performance of Solid Oxide Iron-Air Battery Operated at 550° C. *J. Electrochem. Soc.* 160, A1241-1247 (2013).

[20]. Zhao, X., Gong, Y., Li, X., Xu, N. & Huang, K. Cyclic Durability of a Solid Oxide Fe-Air Redox Battery Operated at 650° C. *J. Electrochem. Soc.* 160, A1716-A1719 (2013).

[21]. Deville, S. Freeze-casting of porous ceramics: A review of current achievements and issues. *Adv. Eng. Mater.* 10, 155-169 (2008).

[22]. Scotti, K. L. & Dunand, D. C. Freeze casting-A review of processing, microstructure and properties via the open data repository, FreezeCasting.net. *Prog. Mater. Sci.* 94, 243-305 (2018).

[23]. Fukushima, M., Yoshizawa, Y. I. & Ohji, T. Macroporous Ceramics by Gelation—Freezing Route Using Gelatin. *Adv. Eng. Mater.* 16, 607-620 (2014).

[24]. Stolze, C., Janoschka, T., Schubert, U. S., Müller, F. A. & Flauder, S. Directional Solidification with Constant Ice Front Velocity in the Ice-Templating Process. *Advanced Engineering Materials* 18, 111-120 (2016).

[25]. Scotti, K. L., Northard, E. E., Plunk, A., Tappan, B. C. & Dunand, D. C. Acta Materialia Directional solidification of aqueous TiO 2 suspensions under reduced gravity. 124, 608-619 (2017).

[26]. Jo, H. et al. Morphological Study of Directionally Freeze-Cast Nickel Foams. doi:10.1007/540553-016-0068-y.

[27]. Park, H. et al. Surface-oxidized, freeze-cast cobalt foams: Microstructure, mechanical properties and electrochemical performance. *Acta Mater.* 142, 213-225 (2018).

[28]. Plunk, A. A. & Dunand, D. C. Iron foams created by directional freeze casting of iron oxide, reduction and sintering. *Mater. Lett.* 191, 112-115 (2017).

[29]. Wilke, S. K., Mack, J. B., Kenel, C. & Dunand, D. C. Evolution of directionally freeze-cast Fe2O3 and Fe2O3+NiO green bodies during reduction and sintering to create lamellar Fe and Fe-20Ni foams. *J. Alloys Compd.* 889, 161707 (2022).

[30]. Wilke, S. K. & Dunand, D. C. Structural evolution of directionally freeze-cast iron foams during oxidation/reduction cycles. *Acta Mater.* 162, 90-102 (2019).

[31]. Lloreda-Jurado, P. J. et al. Structure-processing relationships of freeze-cast iron foams fabricated with various solidification rates and post-casting heat treatment. *J. Mater. Res.* (2020). doi:10.1557/jmr.2020.175

[32]. Wilke, S. K. & Dunand, D. C. In operando tomography reveals degradation mechanisms in lamellar iron foams during redox cycling at 800° C. *J. Power Sources* 448, 227463 (2020).

[33]. Wilke, S. K., Lundberg, R. A. & Dunand, D. C. Hierarchical Structural Changes during Redox Cycling of Fe-Based Lamellar Foams Containing YSZ, CeO2, or ZrO2. *ACS Appl. Mater. Interfaces* 12, 27190-27201 (2020).

[34]. Otsuka, K., Kaburagi, T., Yamada, C. & Takenaka, S. Chemical storage of hydrogen by modified iron oxides. *J. Power Sources* 122, 111-121 (2003).

[35]. Wang, H., Zhang, J., Wen, F. & Bai, J. Effect of Mo dopants on improving hydrogen production by redox of iron oxide: catalytic role of Mo cation and kinetic study. *RSC Adv.* 3, 10341-10348 (2013).

[36]. Liu, X. & Wang, H. Hydrogen production from water decomposition by redox of Fe2O3 modified with single- or double-metal additives. *J. Solid State Chem.* 183, 1075-1082 (2010).

[37]. Wang, H., Liu, X. & Wen, F. Hydrogen production by the redox of iron oxide prepared by hydrothermal synthesis. *Int. J. Hydrogen Energy* 37, 977-983 (2012).

[38]. Wen, F., Wang, H. & Tang, Z. Kinetic study of the redox process of iron oxide for hydrogen production at oxidation step. *Thermochim. Acta* 520, 55-60 (2011).

[39]. Romero, E., Soto, R., Duran, P., Herguido, J. & Perla, J. A. Molybdenum addition to modified iron oxides for improving hydrogen separation in fixed bed by redox processes. *Int. J. Hydrogen Energy* 37, 6978-6984 (2012).

[40]. Wang, M., Li, N., Wang, Z., Chen, C. & Zhan, Z. Electrochemical performance and redox stability of solid oxide fuel cells supported on dual-layered anodes of Ni—YSZ cermet and Ni—Fe alloy. *Int. J. Hydrogen Energy* 47, 5453-5461 (2022).

[41]. Xu, N., Chen, M. & Han, M. Oxidation behavior of a Ni—Fe support in SOFC anode atmosphere. *J. Alloys Compd.* 765, 757-763 (2018).

[42]. Sakai, T., Inoishi, A., Ogushi, M., Ida, S. & Ishihara, T. Characteristics of Fe-air battery using Y2O3-stabilized-ZrO2 electrolyte with Ni—Fe electrode and Ba0.6La0.4CoO3-δ electrode operated at intermediate temperature. *J. Energy Storage* 7, 115-120 (2016).

[43]. Thaler, M. & Hacker, V. Storage and separation of hydrogen with the metal steam process. *Int. J. Hydrogen Energy* 37, 2800-2806 (2012).

[44]. Wilke, S. K. & Dunand, D. C. Fe—Ni foams self-heal during redox cycling: Via reversible formation/homogenization of a ductile Ni scaffold. *J. Mater. Chem. A* 8, 19375-19386 (2020).

[45]. Dougherty, R. & Kunzelmann, K.-H. Computing Local Thickness of 3D Structures with ImageJ. *Microsc. Microanal.* 13, 1678-1679 (2007).

[46]. Thyng, K. M., Greene, C. A., Hetland, R. D., Zimmerle, H. M. & DiMarco, S. F. True colors of oceanography. *Oceanography* 29, 9-13 (2016).

[47]. He, S. et al. Baseline correction for Raman spectra using an improved asymmetric least squares method. *Anal. Methods* 6, 4402-4407 (2014).

[48]. Newville, M., Stensitzki, T., Allen, D. B. & Ingargiola, A. LMFIT: Non-Linear Least-Square Minimization and Curve-Fitting for Python. (2014). doi:10.5281/ZENOD0.11813

[49]. Eigen, J., Rutjens, B. & Schroeder, M. Partial redox cycling of composite storage materials for rechargeable oxide batteries. *J. Energy Storage* 43, 103161 (2021).

[50]. Kubaschewski, O. *Iron Binary Phase Diagrams*. (1982).

[51]. Brandes, E. A. & Brook, G. B. *Smithells Metals Reference Book*. Butterworth Heinemann (1992).

[52]. Riedel, H. & Svoboda, J. A theoretical study of grain growth in porous solids during sintering. *Acta Metall. Mater.* 41, 1929-1936 (1993).

[53]. Liu, Y. & Patterson, B. R. Grain Growth Inhibition by Porosity. *Acta Met. mater* 41, 2651-2656 (1993).

[54]. Wagner, C. Internal oxidation of Cu—Pd and Cu—Pt alloys. *Corros. Sci.* 8, 889-893 (1968).

[55]. Combe, A. & Cabane, J. Mechanism of internal oxidation in silver alloys. *Oxid. Met.* 1984 211 21, 21-37 (1984).

[56]. Guruswamy, S., Park, S. M., Hirth, J. P. & Rapp, R. A. Internal oxidation of Ag-in alloys: Stress relief and the influence of imposed strain. *Oxid. Met.* 1986 261 26, 77-100 (1986).

[57]. Lin, B., Zhang, F., Feng, D., Tang, K. & Feng, X. Accumulative plastic strain of thawed saturated clay under long-term cyclic loading. *Eng. Geol.* 231, 230-237 (2017).

[58]. Tang, Y., Miao, Q., Qiu, S., Zhao, K. & Hu, L. Novel freeze-casting fabrication of aligned lamellar porous alumina with a centrosymmetric structure. *J. Eur. Ceram. Soc.* 34, 4077-4082 (2014).

[59]. Ojuva, A. et al. Mechanical performance and CO2 uptake of ion-exchanged zeolite A structured by freeze-casting. *J. Eur. Ceram. Soc.* 35, 2607-2618 (2015).

[60]. Bai, H., Chen, Y., Delattre, B., Tomsia, A. P. & Ritchie, R. O. Bioinspired large-scale aligned porous materials assembled with dual temperature gradients. *Sci. Adv.* 1, (2015).

[61]. Mack, J. B., Pennell, S. M. & Dunand, D. C. Microstructural evolution of lamellar Fe-25Ni foams during steam-hydrogen redox cycling. Submitted. 1-29

[62]. Bahzad, H. et al. Iron-based chemical-looping technology for decarbonising iron and steel production. *Int. J. Greenh. Gas Control* 91, (2019).

[63]. Jones, N. J. A Study of the Oxidation of Fe1-xCox Alloys and their Resulting Magnetic Properties. (2011). doi:10.1184/R1/6714404.V1

[64]. Peden, C. H. F., Kidd, K. B. & Shinn, N. D. Metal/metal-oxide interfaces: A surface science approach to the study of adhesion. *J. Vac. Sci. Technol. A* 9, 1518 (1991).

[65]. Pennell, S. M., Mack, J. B. & Dunand, D. C. Evolution of lamellar architecture and microstructure during redox cycling of Fe—Co and Fe—Cu foams. Submitted.

[66]. Kenel, C., Casati, N. P. M. & Dunand, D. C. 3D ink-extrusion additive manufacturing of CoCrFeNi high-entropy alloy micro-lattices. *Nat. Commun.* 2019 101 10, 1-8 (2019).

[67]. Mo, F.-, Ferndndez Guillermet, A. & Cbrdoba, A. Provisional The Fe—Mo (Iron-Molybdenum) System Phases and Structures Equilibrium Diagram FIG. 1 Fe—Mo Phase Diagram.

[68]. Koyama, K., Morishita, M., Harada, T. & Maekawa, N. Determination of Standard Gibbs Energies of Formation of of the Fe—Mo—O Ternary System and Phase of the Fe—Mo Binary System by Electromotive Force Measurement Using a Y 2 O 3-Stabilized ZrO 2 Solid Electrolyte The standard Gibbs energies of formation of

[69]. Nelson, A. T., Sooby, E. S., Kim, Y. J., Cheng, B. & Maloy, S. A. High temperature oxidation of molybdenum in water vapor environments. *J. Nucl. Mater.* 448, 441-447 (2014).

[70]. Morales Estrella, R. Hydrogen Reduction Route towards the Production of Nano-Grained Alloys.—Synthesis and Characterization of $Fe_2Mo$ Powder.

[71]. High efficiency iron electrode and additives for use in rechargeable iron-based batteries, U.S. Ser. No. 10/374,261B2

[72]. Iron-air rechargeable battery, U.S. Pat. No. 8,758,948B2

[73]. Microscopically ordered solid electrolyte architecture manufacturing methods and processes thereof for use in solid-state and hybrid lithium ion batteries, US20200153037A1

[74]. Metallic foam anode coated with active oxide material, U.S. Ser. No. 10/343,213B2

[75]. Otsuka, K., et al. (2003). "Chemical storage of hydrogen by modified iron oxides." Journal of Power Sources 122(2): 111-121.

[76]. Wang, H., et al. (2013). "Effect of Mo dopants on improving hydrogen production by redox of iron oxide: catalytic role of Mo cation and kinetic study." RSC Advances 3(26): 10341-10348.

[77]. Romero, E., et al. (2012). "Molybdenum addition to modified iron oxides for improving hydrogen separation in fixed bed by redox processes." International Journal of Hydrogen Energy 37(8): 6978-6984.

[78]. Thaler, M. and V. Hacker (2012). "Storage and separation of hydrogen with the metal steam process." International Journal of Hydrogen Energy 37(3): 2800-2806.

[79]. Wang, H., et al. (2012). "Hydrogen production by the redox of iron oxide prepared by hydrothermal synthesis." International Journal of Hydrogen Energy 37(1): 977-983.

[80]. Wang, H., et al. (2008). "Hydrogen Production by Redox of Cation-Modified Iron Oxide." The Journal of Physical Chemistry C 112(14): 5679-5688.

[81]. Hui, W., et al. (2008). "Hydrogen production by redox of bimetal cation-modified iron oxide." International Journal of Hydrogen Energy 33(23): 7122-7128.

[82]. Wen, F., et al. (2011). "Kinetic study of the redox process of iron oxide for hydrogen production at oxidation step." Thermochimica Acta 520(1): 55-60.

[83]. Datta, P., et al. (2011). "Influence of molybdenum on the stability of iron oxide materials for hydrogen production with cyclic water gas shift process." Materials Chemistry and Physics 129(3): 1089-1095.

[84]. Zhang, C. and K. Huang (2016). "An Intermediate-Temperature Solid Oxide Iron-Air Redox Battery Operated on O2—Chemistry and Loaded with Pd-Catalyzed Iron-Based Energy Storage Material." ACS Energy Letters 1(6): 1206-1211.

[85]. Zhao, X., et al. (2012). "Energy storage characteristics of a new rechargeable solid oxide iron-air battery." RSC Advances 2(27): 10163-10166.

[86]. Zhao, X., et al. (2013). "Performance of Solid Oxide Iron-Air Battery Operated at 550° C. Journal of The Electrochemical Society 160(8): A1241-A1247.

[87]. C. Kenel, T. Davenport, X. Li, R. N. Shah, D. C. Dunand "Kinetics of alloy formation and densification in Fe—Ni—Mo microfilaments extruded from oxide- or metal-powder inks". Acta Materialia Volume 193, 2020, 51-60.

What is claimed is:

1. An iron-based foam usable for an electrochemical device, comprising:
a composition comprising iron (Fe) and a refractory element processed to form the iron-based foam having a hierarchical porous structure with self-assembled channels for gas flow reactions and internal space to accommodate volumetric changes on oxidation,
wherein the refractory element comprises molybdenum (Mo), wherein Mo is in a range of about 15-30 at %, and Fe is in balance in the iron-based foam.

2. The iron-based foam of claim 1, being formed by directional, water-based freeze casting of the composition.

3. The iron-based foam of claim 1, wherein Mo is about 25 at % in the iron-based foam.

4. The iron-based foam of claim 3, wherein the iron-based foam, when subjected to steam-hydrogen redox cycling at about 800° C., is more damage- and sintering-resistant than Fe, Fe-25Ni and Fe-25Co foams, and after 50 redox cycles at about 800° C., the iron-based foam maintains at least 80% of its initial porosity.

5. An iron-based foam usable for an electrochemical device, comprising:
a composition comprising iron (Fe) and a refractory element processed to form the iron-based foam having a hierarchical porous structure with self-assembled channels for gas flow reactions and internal space to accommodate volumetric changes on oxidation,
wherein the refractory element comprises molybdenum (Mo); and
wherein the iron-based foam has three distinct phases: (i) α-Fe(Mo) solid solution with a BCC crystal structure, (ii) Fe-rich p-phase whose composition is close to μ-$Fe_3Mo_2$, and (iii) mixed Fe—Mo carbide including $Fe_3Mo_3C$ with a FCC crystal structure.

6. The iron-based foam of claim 5, wherein about 51.5 mol % of the iron-based foam is the α-Fe(Mo) phase, and the remaining is divided between μ-$Fe_3Mo_2$ representing about 45.1 mol % and $Fe_3Mo_3C$ representing about 3.4 mol %.

7. The iron-based foam of claim 5, wherein the carbon comes from a binder burnout during a reduction and sintering process, with an initial carbon content of about 0.49 wt %.

8. The iron-based foam of claim 5, wherein within the microstructure, the phases are presented in two distinct regions representing a Fe-rich region and a Mo-rich region.

9. The iron-based foam of claim 1, wherein during redox cycling with steam and hydrogen, respectively, the iron-based foam undergoes reversible oxidation and reduction, without internal damage, because of its hierarchical microstructure and sintering inhibition provided by Mo.

10. The iron-based foam of claim 1, wherein the composition further comprises at least one of tungsten (W), tantalum (Ta), niobium (Nb), vanadium (V), nickel (Ni), cobalt (Co), and copper (Cu).

11. The iron-based foam of claim 1, being a hierarchically porous foam including:
wide channels between neighboring lamellae, which operably provide gas access to lamellae, into and out of the hierarchically porous foam and accommodate lamellar expansion and contraction without interlamellar contact and sintering, thereby preventing macroscopic foam densification; and/or
microporosity within lamellae, which operably provides additional gas access and free volume to accommodate the volumetric expansion of lamellae during oxidation, thereby limiting the radial expansion of lamellae, lowers the diffusion distances during oxidation, thereby accelerating kinetics and limiting formation of Kirkendall pores, and provides additional Kirkendall pore sinks, thereby preventing large-scale cracking of lamellae.

12. An electrochemical device, comprising:
at least one iron-based foam of claim 1.

13. The electrochemical device of claim 12, being an iron-air battery, or a hydrogen storage system.

14. An iron-based foam usable for an electrochemical device, comprising:
a composition comprising iron (Fe) and a refractory element processed to form the iron-based foam having a hierarchical porous structure with self-assembled channels for gas flow reactions and internal space to accommodate volumetric changes on oxidation,
wherein the refractory element comprises tungsten (W), tantalum (Ta), or niobium (Nb).

15. The iron-based foam of claim 14, being formed by directional, water-based freeze casting of the composition.

16. The iron-based foam of claim 14, wherein the composition further comprises at least one of tungsten (W), tantalum (Ta), niobium (Nb), vanadium (V), nickel (Ni), cobalt (Co), and copper (Cu).

17. The iron-based foam of claim 14, being a hierarchically porous foam including:
wide channels between neighboring lamellae, which operably provide gas access to lamellae, into and out of the hierarchically porous foam and accommodate lamellar expansion and contraction without interlamellar contact and sintering, thereby preventing macroscopic foam densification; and/or
microporosity within lamellae, which operably provides additional gas access and free volume to accommodate the volumetric expansion of lamellae during oxidation, thereby limiting the radial expansion of lamellae, lowers the diffusion distances during oxidation, thereby accelerating kinetics and limiting formation of Kirkendall pores, and provides additional Kirkendall pore sinks, thereby preventing large-scale cracking of lamellae.

18. An electrochemical device, comprising:
at least one iron-based foam of claim 14.

19. The electrochemical device of claim 18, being an iron-air battery, or a hydrogen storage system.

* * * * *